United States Patent
Guerrero et al.

(10) Patent No.: US 12,059,612 B2
(45) Date of Patent: *Aug. 13, 2024

(54) EXTENDABLE MECHANISM AND CONTROLLER WITH EXTENDABLE MECHANISM

(71) Applicant: RAZER (ASIA-PACIFIC) PTE. LTD., Singapore (SG)

(72) Inventors: Gil Jr Palma Guerrero, Singapore (SG); Ien Yu Tong, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,367

(22) Filed: May 23, 2023

(65) Prior Publication Data

US 2023/0364503 A1 Nov. 16, 2023

Related U.S. Application Data

(63) Continuation of application No. 17/262,183, filed as application No. PCT/SG2018/050451 on Sep. 6, 2018, now Pat. No. 11,697,066.

(51) Int. Cl.
*A63F 13/24* (2014.01)
(52) U.S. Cl.
CPC .................................. *A63F 13/24* (2014.09)
(58) Field of Classification Search
None
See application file for complete search history.

(56) References Cited

U.S. PATENT DOCUMENTS

| | | | |
|---|---|---|---|
| 7,833,097 B1 | 11/2010 | Maddox et al. | |
| 10,668,371 B2 | 6/2020 | Guerrero, Jr. | |
| 11,697,066 B2 * | 7/2023 | Guerrero, Jr. | A63F 13/92 463/37 |

(Continued)

FOREIGN PATENT DOCUMENTS

| | | |
|---|---|---|
| CN | 204380232 U | 6/2015 |
| CN | 107261494 A | 10/2017 |

(Continued)

OTHER PUBLICATIONS

Wireless Bluetooth Game Controller by Gametel (https://android-advice.com/wireless-bluetooth-game-controller-by-gametel/) in 3 pages.

(Continued)

*Primary Examiner* — Peter J Iannuzzi
(74) *Attorney, Agent, or Firm* — Polsinelli PC

(57) ABSTRACT

An extendable mechanism may include an extension member. The extendable mechanism may further include a link member which is provided with an extension-member-guide element. The extension member may be in engagement with the extension-member-guide element of the link member in a manner so as to be retractably extendable from the link member in an extension direction along an axis of the extension member. The extendable mechanism may further include a link-member-guide element for being disposed at the body structure. The link member may be in engagement with the link-member-guide element in a manner so as to be retractably extendable from the link-member-guide element in the extension direction. The extendable mechanism may further include a biasing member for being arranged between the link member and the body structure. A controller may include a controller body and the extendable mechanism.

20 Claims, 7 Drawing Sheets

(56) References Cited

U.S. PATENT DOCUMENTS

| | | |
|---|---|---|
| 2010/0296232 A1 | 11/2010 | Yeh et al. |
| 2013/0077213 A1* | 3/2013 | Kao .................. G06F 1/1628 361/679.01 |
| 2014/0179437 A1 | 6/2014 | King et al. |
| 2014/0364231 A1* | 12/2014 | Cramer .................. A63F 13/20 463/37 |
| 2014/0364232 A1 | 12/2014 | Cramer et al. |
| 2015/0205328 A1 | 7/2015 | Lin et al. |
| 2015/0273325 A1 | 10/2015 | Falc et al. |
| 2015/0281422 A1 | 10/2015 | Kessler et al. |
| 2017/0056762 A1 | 3/2017 | Gafni |
| 2018/0133594 A1 | 5/2018 | Guo |
| 2019/0358534 A1* | 11/2019 | Fang .................. A63F 13/24 |
| 2020/0016484 A1 | 1/2020 | Guerrero, Jr. |

FOREIGN PATENT DOCUMENTS

| | | |
|---|---|---|
| CN | 110087745 A | 8/2019 |
| DE | 10 2015 203523 A1 | 9/2016 |
| EP | 1 380 324 A1 | 1/2004 |
| JP | 2002182820 A | 6/2002 |
| JP | 2002182836 A | 6/2002 |
| JP | 2002182856 A | 6/2002 |
| JP | 2002196859 A | 7/2002 |
| KR | 10-2011-0116892 A | 10/2011 |
| TW | 201825160 | 7/2018 |
| WO | WO 97/45785 A1 | 12/1997 |
| WO | WO 2004/007041 A2 | 1/2004 |

OTHER PUBLICATIONS

International Search Report and Written Opinion, dated May 24, 2019, for the corresponding International Application No. PCT/SG2018/050451 in 13 pages.

Office Action and English translation issued Jan. 9, 2023 for corresponding TW application No. 108131039 (30 pages).

Extended European Search Report mailed Aug. 17, 2021, 9 pages, for the corresponding European Patent Application No. 18932788.5.

* cited by examiner

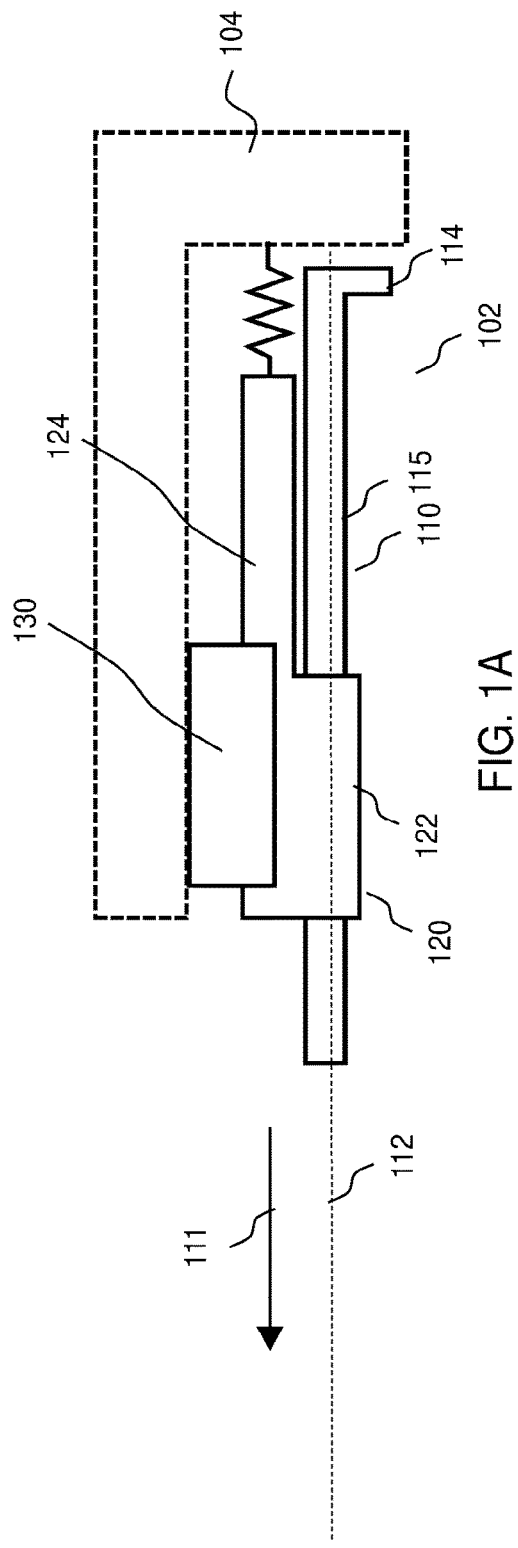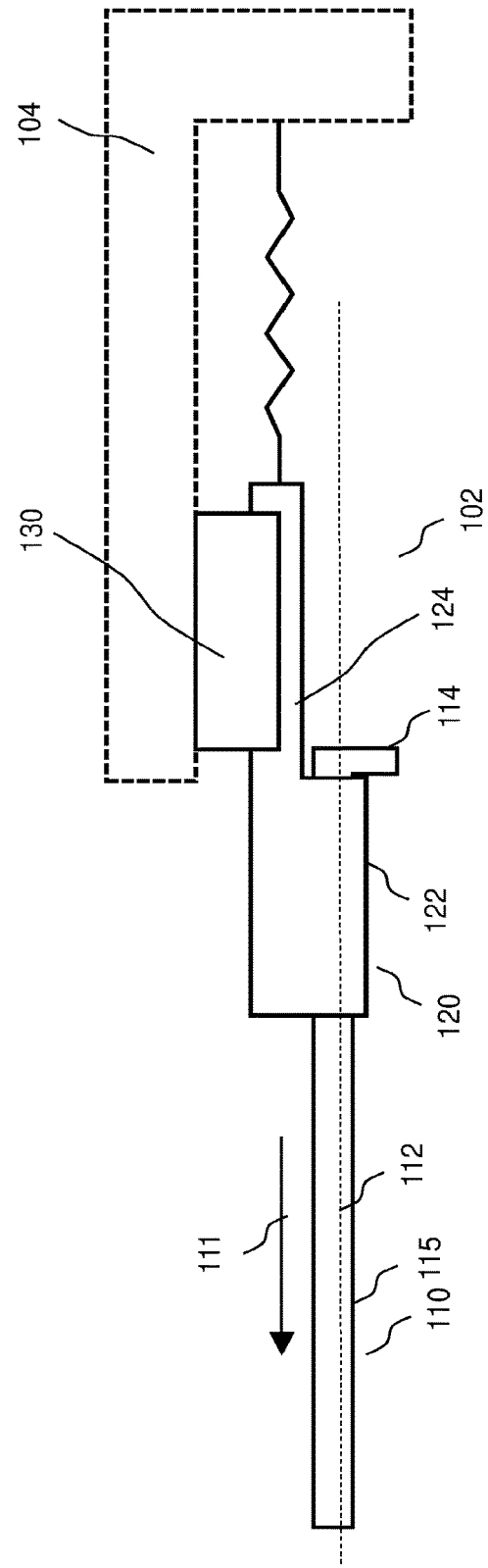

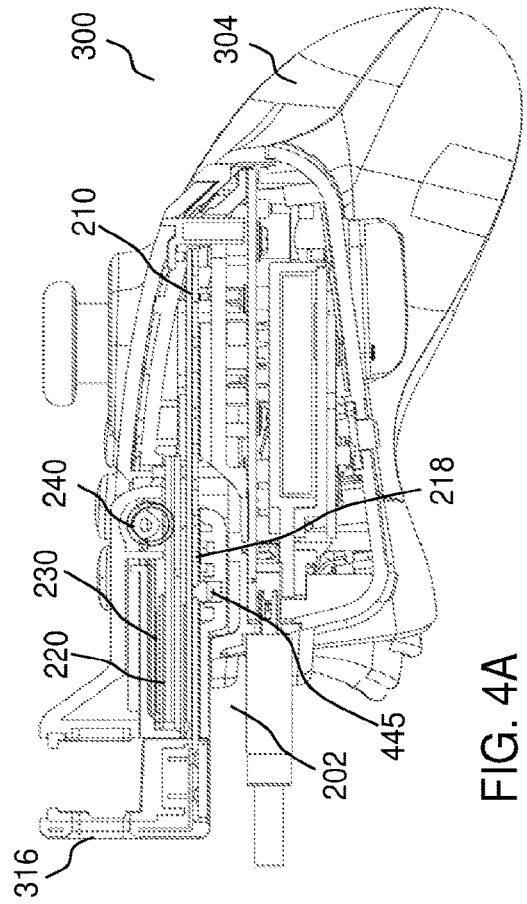
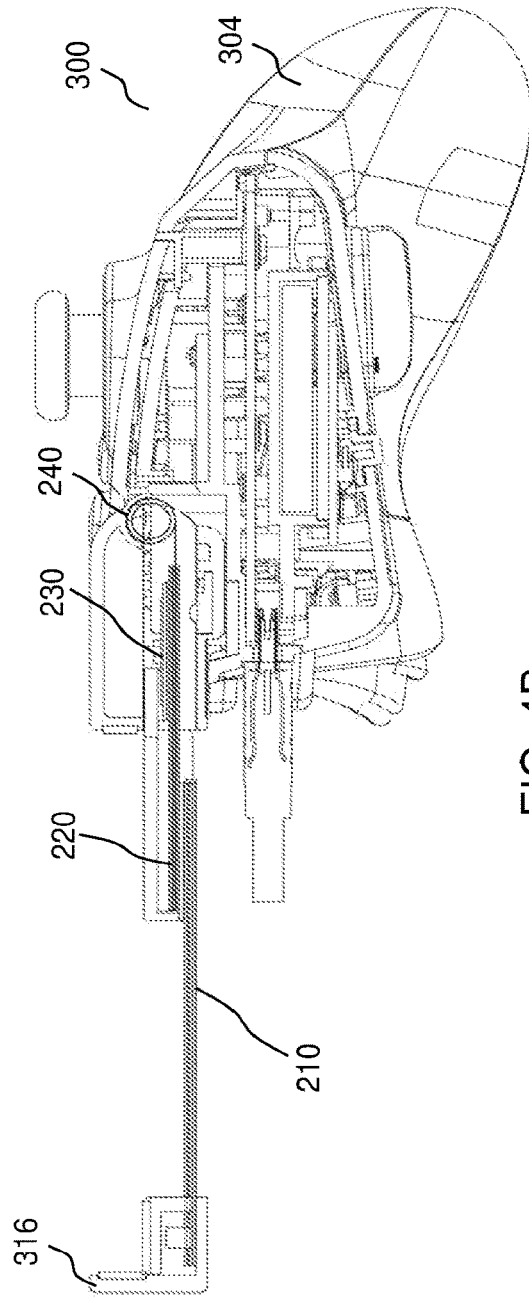

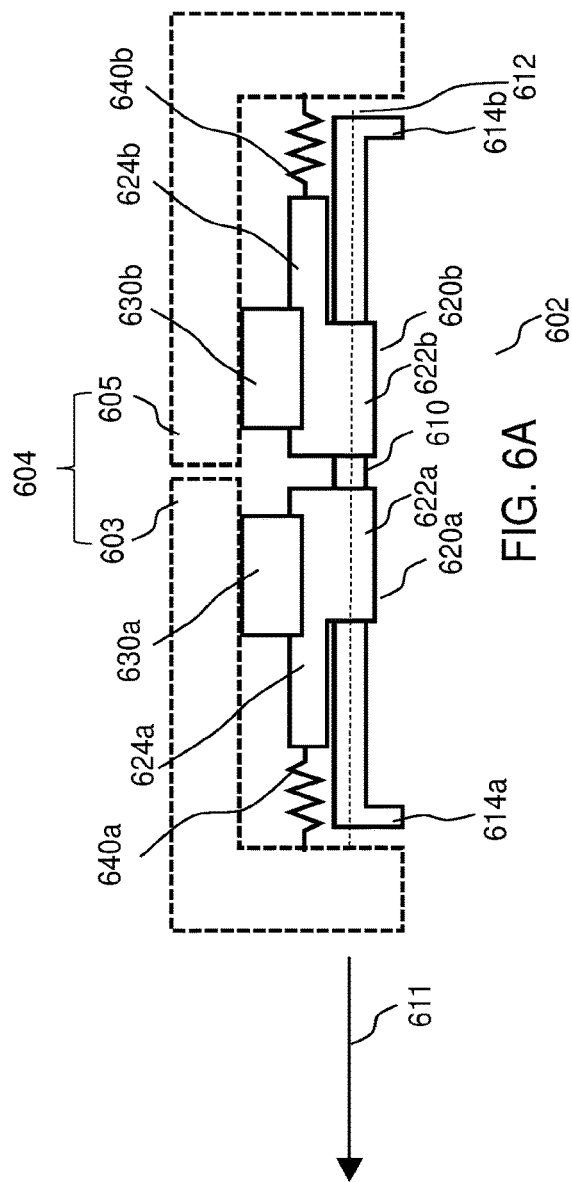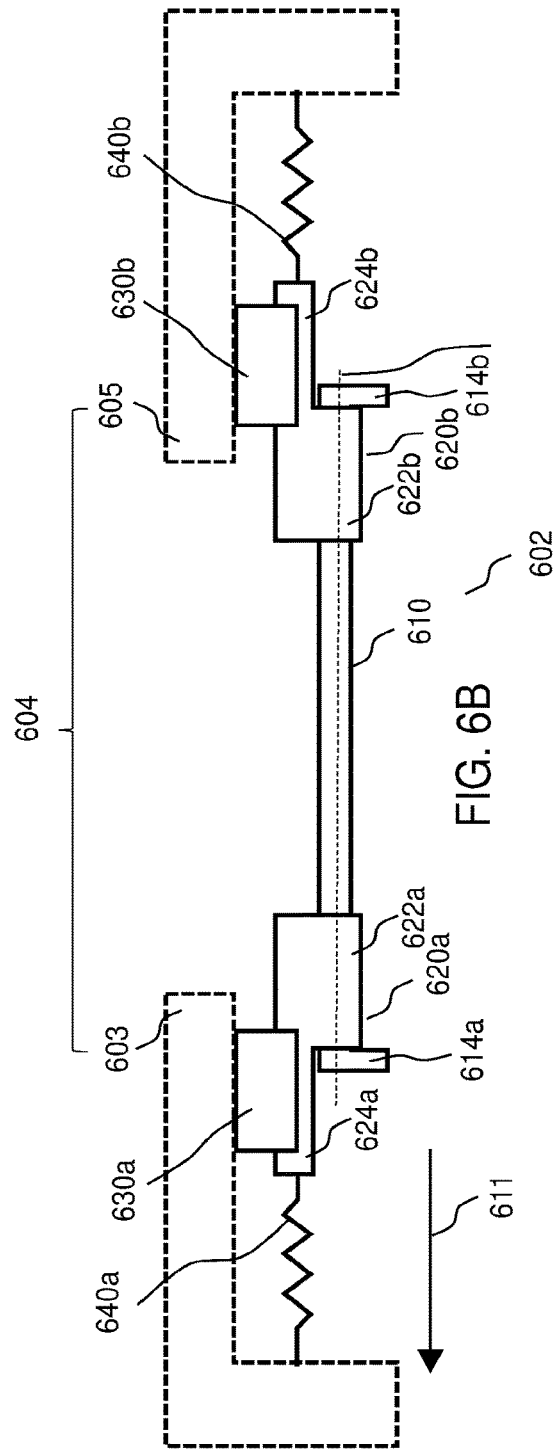

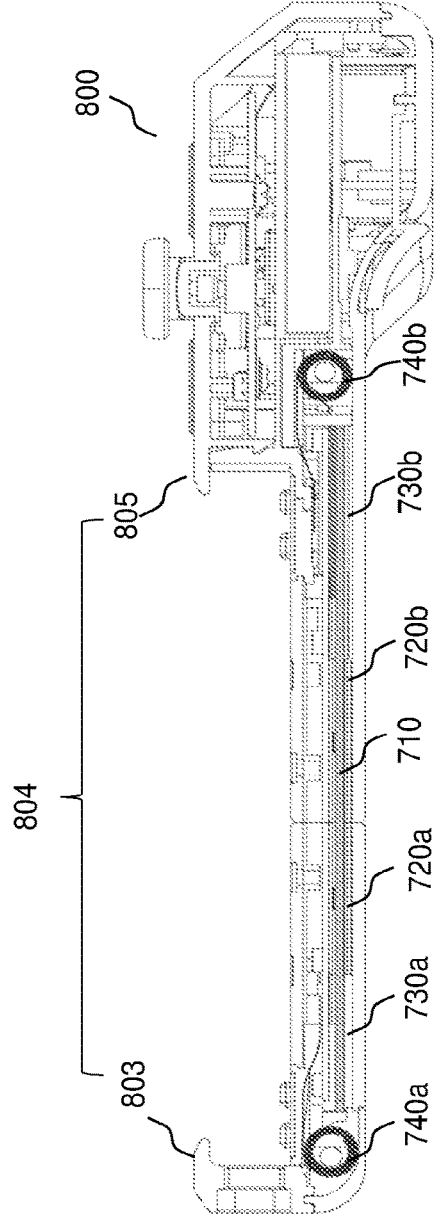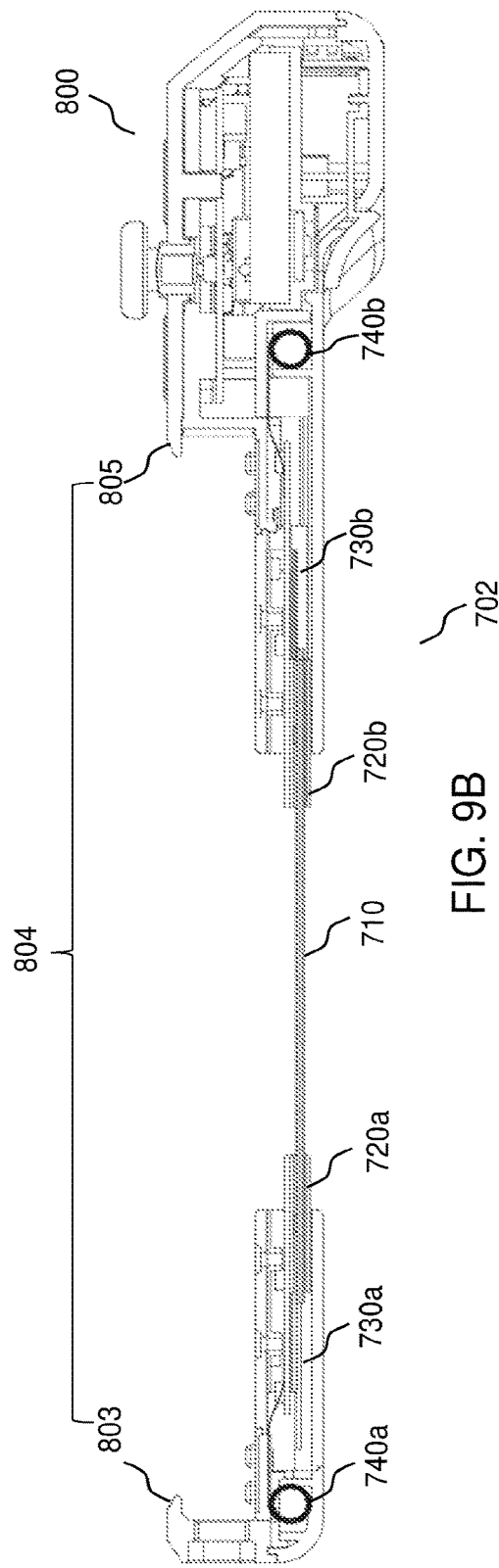

EXTENDABLE MECHANISM AND CONTROLLER WITH EXTENDABLE MECHANISM

CROSS-REFERENCE TO RELATED APPLICATIONS

This application is a continuation of U.S. patent application Ser. No. 17/262,183, filed Jan. 21, 2021, which is a national stage application (under 35 U.S.C. § 371) of International Patent Application No. PCT/SG2018/050451 filed Sep. 6, 2018, the contents which are incorporated herein by reference to their entirety.

TECHNICAL FIELD

Various embodiments generally relate to an extendable mechanism for a body structure, an extendable mechanism between a first part of a body structure and a second part of a body structure, and a controller with an extendable mechanism. In particular, various embodiments generally relate to an extendable mechanism for a game controller and a game controller with an extendable mechanism.

BACKGROUND

In the market, game controllers for mobile phones typically include a clamping mechanism for attaching the mobile phone to the respective game controller. Generally, the clamping mechanism uses a single stack slider with continuous spring loading such that a retraction force is always acting to close the clamping mechanism as long as the clamping mechanism is being pulled apart. Thus, from the beginning of opening or pulling apart the clamping mechanism, the retraction force would be acting to close the clamping mechanism. Accordingly, even before the clamping mechanism is opened or pulled apart sufficiently to slot in a portion of the mobile phone, the clamping mechanism already has a strong retraction force to close the clamping mechanism which may cause harm to a user if the user accidentally releases the clamping mechanism while opening. This can result in the clamping mechanism of the game controller pinching the hands of the user from the strong retraction force of the clamping mechanism.

Further, some conventional game controllers use a single slider mechanism which are configured in a manner such that the slider mechanism is an add-on part that always results in a very wobbly and unstable sliding experience for the user. Such game controllers might cause irritation to the user and such game controller may also not be aesthetically pleasing.

Furthermore, some conventional game controllers may include a clip foldable to the body of the controller. Such foldable clip typically takes up a lot of the space of the controller and usually sacrifices the ergonomic placement of buttons in order to fit the foldable clip.

Accordingly, there is a need for an extendable mechanism and a controller with an extendable mechanism that addresses at least some of the issues identified above.

SUMMARY

According to various embodiments, there is provided an extendable mechanism for a body structure. The extendable mechanism may include an extension member. The extendable mechanism may further include a link member which is provided with an extension-member-guide element. The extension member may be in engagement with the extension-member-guide element of the link member in a manner so as to be retractably extendable from the link member in an extension direction along an axis of the extension member. The extendable mechanism may further include a link-member-guide element for being disposed at the body structure. The link member may be in engagement with the link-member-guide element in a manner so as to be retractably extendable from the link-member-guide element in the extension direction. The extendable mechanism may further include a biasing member for being arranged between the link member and the body structure.

According to various embodiments, there is provided an extendable mechanism between a first part of a body structure and a second part of the body structure. The extendable mechanism may include an extension member. The extendable mechanism may further include a first link member which is provided with a first extension-member-guide element. The extension member may be in engagement with the first extension-member-guide element of the first link member in a manner such that the first link member may be retractably movable relative to the extension member in an extension direction of the extendable mechanism along an axis of the extension member. The extendable mechanism may further include a first-link-member-guide element for being disposed at the first part of the body structure. The first link member may be in engagement with the first-link-member-guide element in a manner such that the first-link-member-guide element may be retractably movable relative to the first link member in the extension direction. The extendable mechanism may further include a first biasing member for being arranged between the first link member and the first part of the body structure. The extendable mechanism may further include a second link member which is provided with a second extension-member-guide element. The second extension-member-guide element of the second link member may be in engagement with the extension member in a manner such that the extension member may be retractably movable relative to the second link member in the extension direction. The extendable mechanism may further include a second-link-member-guide element for being disposed at the second part of the body structure. The second-link-member-guide element may be in engagement with the second link member in a manner such that the second link member may be retractably movable relative to the second-link-member-guide element in the extension direction. The extendable mechanism may further include a second biasing member for being arranged between the second link member and the second part of the body structure.

According to various embodiments, there is provided a controller. The controller may include a controller body. The controller may further include an extendable mechanism. The extendable mechanism may include an extension member. The extendable mechanism may further include a link member which is provided with an extension-member-guide element. The extension member is in engagement with the extension-member-guide element of the link member in a manner so as to be retractably extendable from the link member in an extension direction along an axis of the extension member. The extendable mechanism may further include a link-member-guide element which is disposed at the controller body. The link member may be in engagement with the link-member-guide element in a manner so as to be retractably extendable from the link-member-guide element in the extension direction. The extendable mechanism may further include a biasing member which is arranged between the link member and the controller body. The biasing member may be configured to apply a biasing force on the link member in a direction opposite to the extension direction.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1A shows a schematic diagram of an extendable mechanism in a retracted state according to various embodiments;

FIG. 1B shows a schematic diagram of the extendable mechanism of FIG. 1A in an extended state according to various embodiments;

FIG. 4A shows a cross sectional view of the controller of FIG. 3 with the extendable mechanism of FIG. 2 in a retracted state according to various embodiments;

FIG. 4B shows a cross sectional view of the controller of FIG. 3 with the extendable mechanism of FIG. 2 in an extended state according to various embodiments;

FIG. 6A shows a schematic diagram of an extendable mechanism in a retracted state according to various embodiments;

FIG. 6B shows a schematic diagram of the extendable mechanism of FIG. 6A in an extended state according to various embodiments;

FIG. 9A shows a cross sectional view of the controller of FIG. 8 with the extendable mechanism of FIG. 7 in a retracted state according to various embodiments; and FIG. 9B shows a cross sectional view of the controller of FIG. 8 with the extendable mechanism of FIG. 7 in an extended state according to various embodiments.

DETAILED DESCRIPTION

Figure 2:
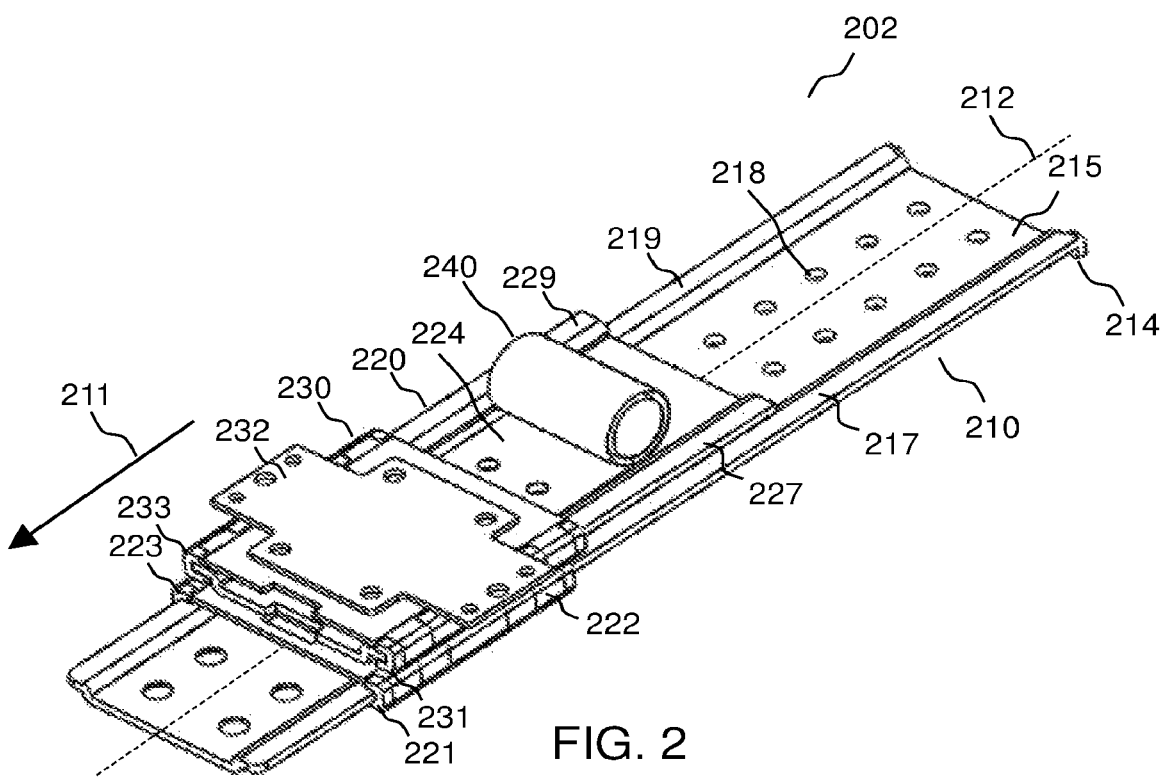
FIG. 2 shows an extendable mechanism according to various embodiments.

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to an extendable mechanism for a body structure, an extendable mechanism between a first part of a body structure and a second part of a body structure, and a controller with an extendable mechanism. According to various embodiments, the controller may be a game controller for a mobile phone or a personal electronic device. Accordingly, the body structure in the various embodiments may be a body of the game controller. According to various embodiments, the extendable mechanism may be configured to be extended from the body of the game controller so as to receive or retain or hold the mobile phone or the personal electronic devices therebetween such that the mobile phone or personal electronic devices may be removably attached or secured or coupled to the body of the game controller. While the body structure is illustrated as a body of a game controller, it is understood that the body structure may be a body of any suitable device that require an extension.

FIG. 1A shows a schematic diagram of an extendable mechanism 102 in a retracted state according to various embodiments. FIG. 1B shows a schematic diagram of the extendable mechanism 102 of FIG. 1A in an extended state according to various embodiments. According to various embodiments, the extendable mechanism 102 may be for a body structure 104. As shown, the extendable mechanism 102 may be for being mounted or secured or attached or coupled to the body structure 104. The extendable mechanism 102 may serve to provide an extension to the body structure 104. In FIG. 1A and FIG. 1B, an outline of the body structure 104 is illustrated by a dotted-line. According to various embodiments, the body structure 104 may be of any shape or size or configuration depending on what is the device embodied by the body structure 104. The body structure 104 as shown in FIG. 1A and FIG. 1B is provided by way of example only and not limitation. According to various embodiments, the body structure 104 may be a body of a game controller for a mobile phone or a personal electronic device.

Referring to FIG. 1A and FIG. 1B, the extendable mechanism 102 for the body structure 104 may include an extension member 110 according to various embodiments. The extension member 110 may be shaped or dimensioned or configured such that it may be for being concealed or contained or kept or held within the body structure 104 in the retracted state of the extendable mechanism 102, and may be for being extended or drawn out from the body structure 104 in the extended state of the extendable mechanism 102. The extension member 110 may serve to be a part of the extendable mechanism 102 that may be physically extended from the body structure 104. According to various embodiments, the extendable member 110 may be of an elongate shape. For example, the extendable member 110 may be an elongate plate or an elongate panel. Accordingly, the extendable member 110 may be extendable in a lengthwise direction relative to the body structure 104 along a longitudinal axis 112 of the extendable member 110.

According to various embodiments, the extendable mechanism 102 may further include a link member 120 which may be provided with an extension-member-guide element 122. The extension-member-guide element 122 may be configured for guiding a relative movement of the extension member 110 with respect to the body structure 104. For example, the extension-member-guide element 122 may be configured for guiding the movement of the extension member 110 as the extension member 110 is being extended or drawn out from the body structure 104. According to various embodiments, the extension member 110 may be in engagement with the extension-member-guide element 122 of the link member 120 in a manner so as to be retractably extendable from the link member 120 (or retractably movable relative to the link member 120) in an extension direction 111 along an axis of the extension member 110. Accordingly, the extension-member-guide element 122 may guide a relative movement between the extension member 110 and the link member 120 of the extendable mechanism 102 such that the extension member 110 may be extendable relative to the link member 120 (or the extension member 110 may be extended or drawn out from the link member 120). According to various embodiments, when the extension member 110 is of an elongate shape, the extension direction 111 of the extension member 110 may be along the longitudinal axis 112 of the elongate extension member 110. According to various embodiments, the extension-member-guide element 122 of the link member 120 may be a separate part from a link body 124 of the link member 120. Accordingly, the extension-member-guide element 122 and the link body 124 may be two separate parts fixedly coupled or joined or connected or attached to each other so as to form the link member 120. According to various other embodiments, the extension-member-guide element 122 and the link body 124 may also be integrally molded or formed as a single unitary piece to form the link member 120.

According to various embodiments, the extendable mechanism 102 may further include a link-member-guide element 130. The link-member-guide element 130 may be for being disposed at the body structure 104. Accordingly, the link-member-guide element 130 may be a separate part from the body structure 104, whereby the link-member-guide element 130 may be for being attached or coupled or fixed or joined or connected to the body structure 104, or an integral portion of the body structure 104, whereby the link-member-guide element 130 may be integrally molded or formed with the body structure 104 as a single unitary piece. According to various embodiments, the link-member-guide element 130 may be configured for guiding a relative movement of the link member 120 with respect to the body structure 104. According to various embodiments, the link member 120 may be in engagement with the link-member-guide element 130 in a manner so as to be retractably extendable from the link-member-guide element 130 (or retractably movable relative to the link-member-guide element 130) in the extension direction 111 of the extension member 110. Accordingly, the link-member-guide element 130 may guide a relative movement between the link member 120 and the link-member-guide element 130 such that the link member 120 may be extendable relative to the link-member-guide element 130 (or the link member 120 may be extended or drawn out from the link-member-guide element 130). The relative movement between the link member 120 and the link-member-guide element 130 may be parallel to the relative movement between the extension member 110 and the link member 120.

According to various embodiments, the extension member 110 of the extendable mechanism 102 may serve as a main extension from the body structure 104, and the link member 120 may serve as a secondary extension from the body structure 104. According to various embodiments, the extension member 110 and the link member 120 may be arranged in an overlapping or a stacked configuration such that, when the extendable mechanism 102 is in the retracted state, the link member 120 may extend over and cover the extension member 110. Hence, the extendable mechanism 102 may provide a compact mechanism with dual-stage extensions for the body structure 104 such that the extendable mechanism 102 may only occupy a small area in the body structure 104.

According to various embodiments, the extendable mechanism 102 may further include a biasing member 140. The biasing member 140 may be for being arranged between the link member 120 and the body structure 104. According to various embodiments, the biasing member 140 may serve to apply a biasing force on the link member 120 in a direction opposite to the extension direction 111 of the extension member 110. Accordingly, the biasing member 140 may serve to provide a retraction force, which may be against the extension movement of the link member 120, for retracting the link member 120 towards the body structure 104. According to various embodiments, the biasing member 140 may include a tape spring, a clock spring, a coil spring, a torsion spring, a compression spring, a tension spring, or any combination thereof.

According to various embodiments, the extension member 110 may include a stopper element 114 at an end (or an inner end) of the extension member 110 opposite the extension direction 111 of the extension member 110. Accordingly, the stopper element 114 may include a protrusion projecting at least substantially perpendicular to the extension member 110 so as to provide a physical barrier or limit between the extension member 110 and the extension-member-guide element 122 of the link member 120 for preventing the entire extension member 110 from being pulled out of the extension-member-guide element 122 of the link member 120. Accordingly, the stopper element 114 may fix or set a maximum relative extension between the extension member 110 and the extension-member-guide element 122 of the link member 120. According to various embodiments, with the stopper element 114 of the extension member 110, when the extension member 110 is fully extended relative to the link member 120, any further force applied to the extension member 110 in the extension direction 111 may cause the force to be transferred to the link member 120 for extending or drawing out the link member 120 relative to the link-member-guide element 130. Accordingly, in use, the extension member 110 may be extended or drawn out first before the link member 120 may be extended or drawn out from the link-member-guide element 130. In one example embodiment, the link-member-guide element 130 is fixed to the body structure 104.

According to various embodiment, the extension member 110 may include a protruding lip 316 (e.g. see FIG. 3) at another end (or an outer end) of the extension member 110 in the extension direction 111 of the extension member 110. By way of example, the protruding lip and the stopper element 114 are disposed at opposite ends of the extension member 110. The protruding lip 316 may be at least substantially perpendicular to the extension member 110. Accordingly, the protruding lip 316 may serve to contact an edge of an object, such as the mobile phone or the personal electronic device, being placed between the protruding lip 316 of the extension member 110 of the extendable mechanism 102 and the body structure 104 such that the object may be removably attached or secured or coupled between the protruding lip 316 of the extendable mechanism 102 and the body structure 104. According to various embodiments, the protruding lip 316 and an extension body 115 of the extension member 110 may be separate parts. Accordingly, the protruding lip 316 may be joined or coupled or fixed or connected or attached to the extension body 115 of the extension member 110. According to various other embodiments, the protruding lip 316 may be integrally molded or formed with the extension body 115 as a single unitary piece to form the extension member 110.

According to various embodiments, the extendable mechanism 102 may be free of biasing member between the extension member 110 and the link member 120. Accordingly, the extendable mechanism 102 may be free of a biasing force being applied to retract the extension member 110 relative to the link member 120. Hence, a user may easily extend or draw out the extension member 110 from the link member 120 without risk of having any of the user's fingers being clamped. Subsequently, with the extension member 110 fully extended or drawn out, the user may then apply a force to the extension member 110 so as to overcome the biasing force applied on the link member 120 in order to extend or draw out the link member 120 with respect to the link-member-guide element 130 for further extending the extendable mechanism 102 such that an object (e.g. mobile phone or personal electronic device) may be placed between the protruding lip 316 of the extension member 110 of the extendable mechanism 102 and the body structure 104. Accordingly, the object may be retained between the protruding lip 316 of the extension member 110 of the extendable mechanism 102 and the body structure 104 by the biasing force acting on the link member 120.

According to various embodiments, the extension member 110 and the extension-member-guide element 122 of the link member 120 may be engaged in a tongue and groove sliding engagement. Accordingly, the extension member 110 may include a pair of tongue projections along opposite side edges of the extension member 110 parallel to the axis or the extension direction 111 of the extension member 110, and the extension-member-guide element 122 of the link member 120 may include a pair of grooves facing towards each other and parallel to the axis or the extension direction 111 of the extension member 110. Accordingly, the pair of tongue projections of the extension member 110 and the pair of grooves of the extension-member-guide element 122 of the link member 120 may be configured to engage such that the respective tongue projections are slidable relative to the corresponding groove. According to various other embodiments, the extension member 110 may include a pair of grooves along opposite side edges of the extension member 110 parallel to the axis or the extension direction 111 of the extension member 110, and the extension-member-guide element 122 of the link member 120 may include a pair of tongue projections directed towards each other and parallel to the axis or the extension direction 111 of the extension member 110. Accordingly, the pair of grooves of the extension member 110 and the pair of tongue projections of the extension-member-guide element 122 of the link member 120 may be configured to engage such that the respective tongue projections are slidable relative to the corresponding groove. According to various embodiments, the tongue and groove sliding engagement may include a protrusion and groove sliding arrangement, or a dovetail tongue and groove sliding arrangement, or a T-shaped tongue and groove sliding arrangement, or a J-shaped tongue and groove sliding arrangement, or an L-shaped tongue and groove sliding arrangement, or a hooked-like tongue and groove sliding arrangement, or any other suitable sliding arrangement.

According to various embodiments, the link member 120 and the link-member-guide element 130 may be engaged in a tongue and groove sliding engagement. Accordingly, the link member 120 may include a pair of tongue projections extending along opposite side edges of the link member 120 parallel to the axis or the extension direction 111 of the extension member 110, and the link-member-guide element 130 may include a pair of grooves facing towards each other and parallel to the axis or the extension direction 111 of the extension member 110. Accordingly, the pair of tongue projections of the link member 120 and the pair of grooves of the link-member-guide element 130 may be configured to engage such that the respective tongue projections are slidable relative to the corresponding groove. According to various other embodiments, the link member 120 may include a pair of grooves extending along opposite side edges of the link member 120 parallel to the axis or the extension direction 111 of the extension member 110, and the link-member-guide element 130 may include a pair of tongue projections directed towards each other and parallel to the axis or the extension direction 111 of the extension member 110. Accordingly, the pair of grooves of the link member 120 and the pair of tongue projections of the link-member-guide element 130 may be configured to engage with each other such that respective tongue projections are slidable relative to the corresponding groove. According to various embodiments, the tongue and groove sliding engagement may include a protrusion and groove sliding arrangement, or a dovetail tongue and groove sliding arrangement, or a T-shaped tongue and groove sliding arrangement, or a J-shaped tongue and groove sliding arrangement, or an L-shaped tongue and groove sliding arrangement, or a hooked-like tongue and groove sliding arrangement, or any other suitable tongue and groove sliding arrangement.

According to various embodiments, the extension member 110 may include two or more holes 218 (e.g. see FIG. 2) lined along a length of the extension member 110 at regular interval. According to various embodiments, the extendable mechanism 102 may further include a spring-loaded projection 445 (e.g. see FIG. 4A) for being disposed at the body structure 104 to cooperate with the two or more holes 218 of the extension member 110 as the extension member 110 is being extended from the body structure 104. Accordingly, the cooperation between the two or more holes 218 along the extension member 110 and the spring-loaded projection 445 may serve to provide intermediate stoppages as the extension member 110 is being extended or drawn out from the body structure 104 so as to avoid the extension member 110 from being pulled out entirely at once. The two or more holes along the extension member 110 may provide discrete interval or length at which the extension movement of the extension member 110 may be disrupted or interrupted.

According to various embodiments, the link-member-guide element 130 may be pivotable about a pivot-axis perpendicular to the extension direction 111 of the extension member 110 to incline the link-member-guide element 130 with respect to the body structure 104. Accordingly, the link-member-guide element 130 may be coupled to the body structure 104 via a hinge joint 546 (e.g. see FIG. 5A) such that the link-member-guide element 130 may be pivotable with respect to the body structure 104 about the hinge joint 546. According to various embodiments, the hinge joint 546 may include a hinge, or a spring-loaded hinge.

FIG. 2 shows an extendable mechanism 202 for a body structure according to various embodiments. As shown, the extendable mechanism 102 may include an extension member 210 according to various embodiments. According to various embodiments, the extendable member 210 may be of an elongate shape, such as an elongate plate or an elongate panel. Accordingly, the extendable member 210 may be extendable in a lengthwise direction along a longitudinal axis 212 of the extendable member 210.

According to various embodiments, the extendable mechanism 202 may further include a link member 220 which may be provided with an extension-member-guide element 222. The extension-member-guide element 222 may be configured for guiding a movement of the extension member 210 as the extension member 210 is being extended or drawn out. According to various embodiments, the extension member 210 may be in engagement with the extension-member-guide element 222 of the link member 220 in a manner so as to be retractably extendable from the link member 220 (or retractably movable relative to the link member 220) in an extension direction 211 along the longitudinal axis 212 of the extension member 210. Accordingly, the extension-member-guide element 222 may guide a relative movement between the extension member 210 and the link member 220 of the extendable mechanism 202 such that the extension member 210 may be extendable relative to the link member 220 (or the extension member 210 may be extended or drawn out from the link member 220). As shown, according to various embodiments, the extension-member-guide element 222 of the link member 220 and a link body 224 of the link member 220 may be separate parts of the link member 220. Accordingly, the extension-member-guide element 222 and the link body 224 may be two separate parts fixedly coupled or joined or connected or attached to each other so as to form the link member 220. As also shown, according to various embodiments, the link body 224 of the link member 220 may be of an elongate shape, such as an elongate plate or an elongate panel.

According to various embodiments, the extendable mechanism 202 may further include a link-member-guide element 230. The link-member-guide element 230 may be for being disposed at the body structure. As shown, according to various embodiments, the link-member-guide element 230 may be a separate part from the body structure such that the link-member-guide element 230 may be for being attached or coupled or fixed or joined or connected to the body structure. Accordingly, the link-member-guide element 230 may serve to couple or join or fix or attach or connect the extendable mechanism 202 to the body structure. As shown, according to various embodiments, the extendable mechanism 202 may include a mounting plate 232 for being configured to couple the link-member-guide element 230 to the body structure. According to various embodiments, the link member 220 may be in engagement with the link-member-guide element 230 in a manner so as to be retractably extendable from the link-member-guide element 230 (or retractably movable relative to the link-member-guide element 230) in the extension direction 211 of the extension member 210. Accordingly, the link-member-guide element 230 may guide a relative movement between the link member 220 and the link-member-guide element 230 such that the link member 220 may be extendable relative to the link-member-guide element 230 (or the link member 220 may be extended or drawn out from the link-member-guide element 230). The relative movement between the link member 220 and the link-member-guide element 230 may be parallel to the relative movement between the extension member 210 and the link member 220.

According to various embodiments, the extension member 210 of the extendable mechanism 202 may serve as a main extension, and the link member 220 may serve as a secondary extension. According to various embodiments, the extension member 210 and the link member 220, which may be elongated in shape, may be arranged in an overlapping or a stacked configuration lengthwise such that, when the extendable mechanism 202 is in the retracted state, the link member 220 may extend over and cover a portion of the extension member 210. Hence, the extendable mechanism 202 may provide a compact mechanism with dual-stage extensions such that the extendable mechanism 202 may only occupy a small area in the retracted state.

According to various embodiments, the extendable mechanism 202 may further include a biasing member 240. The biasing member 240 may be for being arranged between the link member 220 and the body structure. According to various embodiments, the biasing member 240 may serve to apply a biasing force on the link member 220 in a direction opposite to the extension direction 211 of the elongate extension member 210. Accordingly, the biasing member 240 may serve to provide a retraction force, which may be against the extension movement of the link member 220, for retracting the link member 220 relative to the link-member-guide element 230. As shown, according to various embodiments, the biasing member 240 may include a tape spring or a clock spring with one end (or an outer end) attached or fixed or coupled or joined to the link member 220.

According to various embodiments, the extension member 210 may include a stopper element 214 at an end (or an inner end) of the extension member 210 opposite the extension direction 211 of the extension member 210. Accordingly, the stopper element 214 may include a protrusion projecting at least substantially perpendicular to the extension member 210 so as to provide a physical barrier or limit between the extension member 210 and the extension-member-guide element 222 of the link member 220 for preventing the entire extension member 210 from being pulled out of the extension-member-guide element 222 of the link member 220. Accordingly, the stopper element 214 may fix or set a maximum relative extension between the extension member 210 and the extension-member-guide element 222 of the link member 220. According to various embodiments, with the stopper element 214 of the extension member 210, when the extension member 210 is fully extended relative to the link member 220, any further force applied to the extension member 210 in the extension direction 211 may cause the force to be transferred to the link member 220 for extending or drawing out the link member 220 relative to the link-member-guide element 230. Accordingly, in use, the extension member 210 may be extended or drawn out first before the link member 220 may be extended or drawn out from the link-member-guide element 230.

According to various embodiments, the extension member 210 and the extension-member-guide element 222 of the link member 220 may be engaged in a tongue and groove sliding engagement. Accordingly, the extension member 210 may include a pair of tongue projections 217, 219 along opposite side edges of the extension member 210 parallel to the longitudinal axis 212 or the extension direction 211 of the extension member 210, and the extension-member-guide element 222 of the link member 220 may include a pair of grooves 221, 223 facing towards each other and parallel to the longitudinal axis 212 or the extension direction 211 of the extension member 210. Accordingly, the pair of tongue projections 217, 219 of the extension member 210 may be configured to slidably engage with the pair of grooves 221, 223 of the extension-member-guide element 222 of the link member 220 such that they may be slidable relative to each other. As shown, according to various embodiments, each of the pair of tongue projections 217, 219 of the extension member 210 may have a substantially L-shaped cross-section while each of the pair of grooves 221, 223 of the extension-member-guide element 222 of the link member 220 may have a substantially C-shaped cross-section. According to various embodiments, the pair of tongue projections 217, 219 of the extension member 210 and the pair of grooves 221, 223 of the extension-member-guide element 122 of the link member 220 may enable a stable and wobble-free relative sliding movement between the extension member 210 and the link member 220.

According to various embodiments, the link member 220 and the link-member-guide element 230 may be engaged in a tongue and groove sliding engagement. Accordingly, the link member 220 may include a pair of tongue projections 227, 229 extending along opposite side edges of the link member 220 parallel to the longitudinal axis 212 or the extension direction 211 of the extension member 210, and the link-member-guide element 230 may include a pair of grooves 231, 233 facing towards each other and parallel to the longitudinal axis 212 or the extension direction 211 of the extension member 210. Accordingly, the pair of tongue projections of the link member 220 may be configured to slidably engage with the pair of grooves 231, 233 of the link-member-guide element 230 such that they may be slidable relative to each other. As shown, according to various embodiments, each of the pair of tongue projections 227, 229 of the link member 220 may have a substantially L-shaped cross-section while each of the pair of grooves 231, 233 of the link-member-guide element 230 may have a substantially C-shaped cross-section. According to various embodiments, the pair of tongue projections 227, 229 of the link member 220 and the pair of grooves 231, 233 of the link-member-guide element 230 may enable a stable and wobble-free relative sliding movement between the link member 220 and the link-member-guide element 230.

As shown, according to various embodiments, the extension member 210 may include two or more holes 218 lined along a length of the extension member 210 at regular interval. The two or more holes 218 may be for cooperating with a spring-loaded projection 444 (e.g. see FIG. 4A) to serve as intermediate stoppages as the as the extension member 210 is being extended or drawn out so as to avoid the extension member 210 from being pulled out entirely at once. The two or more holes along the extension member 210 may provide discrete interval or length at which the extension movement of the extension member 210 may be disrupted or interrupted.

Figure 3:
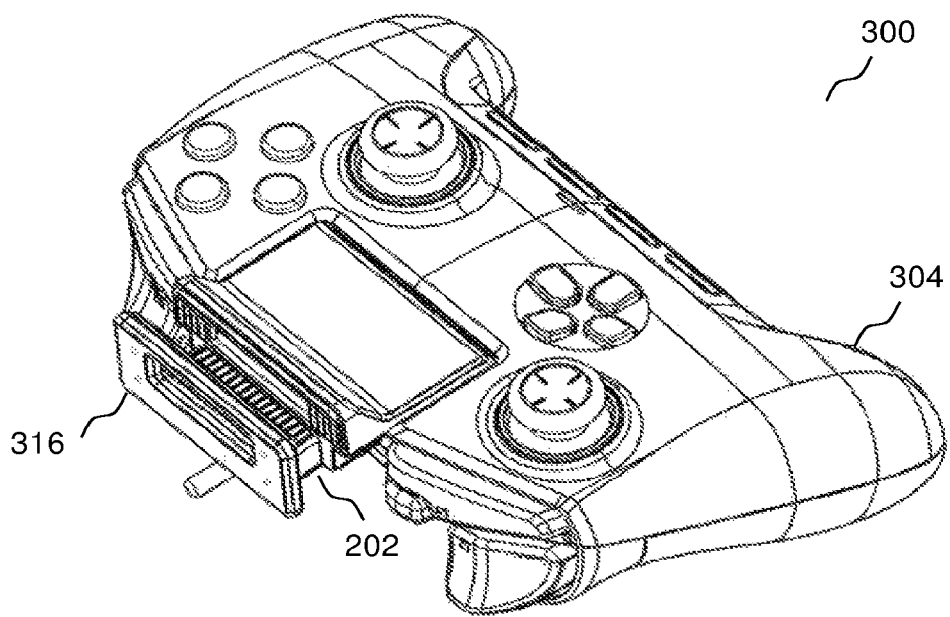
FIG. 3 shows a controller with the extendable mechanism of FIG. 2 according to various embodiments.

FIG. 3 shows a controller 300 with the extendable mechanism 202 of FIG. 2 according to various embodiments. As shown in FIG. 3, according to various embodiments, the controller 300 may include a controller body 304. The extendable mechanism 202 may be disposed within or inside the controller body 304. Accordingly, the extendable mechanism 202 may be mounted or secured or attached or coupled to an interior of the controller body 304. According to various embodiments, the extendable mechanism 202 may serve to provide an extension to the controller body 304. Accordingly, while the extendable mechanism 202 may be within the controller body 304 in the retracted state, the extendable mechanism 202 may be extended or drawn out of the controller body 304 in the extended state. In FIG. 3, the extendable mechanism 202 is shown to be disposed in the center region of the controller body 304. According to various embodiments, the extendable mechanism 202 may be disposed at other locations of the controller body 304 depending on the configuration of the controller body 304. The controller 300 as shown in FIG. 3 is provided by way of example only and not limitation.

As shown in FIG. 3, according to various embodiments, the extendable mechanism 202 may include a protruding lip 316 at an outer end of the extendable mechanism 202 with respect to the controller body 304. Accordingly, with reference to FIG. 2, the protruding lip 316 may be disposed at an outer end of the extension member 210 of the extendable mechanism 202 in the extension direction 211 of the extension member 210. The protruding lip 316 may be at least substantially perpendicular to the extension member 210. Accordingly, the protruding lip 316 may serve to contact an edge of an object, such as the mobile phone or the personal electronic device, being placed between the protruding lip 316 of the extension member 210 of the extendable mechanism 202 and the controller body 304 such that the object may be removably attached or secured or coupled between the protruding lip 316 of the extendable mechanism 202 and the controller body 304. According to various embodiments, the protruding lip 316 and an extension body 215 of the extension member 210 may be separate parts. Accordingly, the protruding lip 316 may be joined or coupled or fixed or connected or attached to the extension body 215 of the extension member 210.

FIG. 4A shows a cross sectional view of the controller 300 of FIG. 3 with the extendable mechanism 202 of FIG. 2 in a retracted state according to various embodiments. FIG. 4B shows a cross sectional view of the controller 300 of FIG. 3 with the extendable mechanism 202 of FIG. 2 in an extended state according to various embodiments.

As shown, according to various embodiments, the controller 300 may include the controller body 304 and the extendable mechanism 202 of FIG. 2. As previously described, the extendable mechanism 202 may include the extension member 210, the link member 220, the link-member-guide element 230, and the biasing member 240.

As shown in FIGS. 4A and 4B, according to various embodiments the link-member-guide element 230 of the extendable mechanism 202 may be disposed at the controller body 304. According to various embodiments, the link-member-guide element 230 of the extendable mechanism 202 may be mounted or secured or fixed or attached or coupled to an interior portion of the controller body 304 such that the link-member-guide element 230 may be fixed (or non-movable relative) to the controller body 304. Accordingly, with the link-member-guide element 230 of the extendable mechanism 202 fixed to the controller body 304, the extension member 210 and the link member 220 of the extendable mechanism 202 may be extendable relative to the controller body 304.

As shown, according to various embodiments, the biasing member 240 of the extendable mechanism 202 may be arranged between the link member 220 of the extendable mechanism 202 and the controller body 304. According to various embodiments, one end of the biasing member 240 may be coupled to the link member 220 of the extendable mechanism 202 and another end of the biasing member 240 may be coupled to the controller body 304. According to various embodiments, the biasing member 240 may be configured to apply a biasing force on the link member 220 in a direction opposite to the extension direction 211 of the extension member 210. Hence, the biasing force of the biasing member 240 may provide a retraction force for retracting the link member 220 as the link member 230 is extended or drawn out from the link-member-guide element 220 which may be fixed to the controller body 304. According to various embodiments, the extendable mechanism 202 may be free of biasing member between the extension member 210 and the link member 220. Accordingly, the extendable mechanism 202 may be free of a biasing force being applied to retract the extension member 210 relative to the link member 220. Hence, a user may easily extend or draw out the extension member 210 from the link member 220 without risk of having any of the user's fingers being clamped between the protruding lip 316 and the controller body 304. Subsequently, with the extension member 210 fully extended or drawn out, the user may then apply a force to the extension member 210 so as to overcome the biasing force applied on the link member 220 in order to extend or draw out the link member 220 with respect to the link-member-guide element 230 (or the controller body 304) for further extending the extendable mechanism 202 such that the object (e.g. mobile phone or personal electronic device) may be placed between the protruding lip 316 and the controller body 304. Accordingly, the object may be retained between the protruding lip 316 and the controller body 304 by the biasing force acting on the link member 220 of the extendable mechanism 202.

As shown, according to various embodiments, the controller body 304 may include the spring-loaded projection 445 disposed at the controller body 304. According to various embodiments, the spring-loaded projection 445 may be disposed inside the controller body 304 or at an interior portion of the controller body 304. According to various embodiments, the spring-loaded projection 445 may be disposed at the interior portion of the controller body 304 which may be immediately adjacent the extension member 210 of the extendable mechanism 202 when the extendable mechanism 202 is in the retracted state. According to various embodiments, the spring-loaded projection 445 may be configured to cooperate with the two or more holes 218 of the extension member 210 as the extension member 210 is being extended from the controller body 304. Accordingly, the cooperation between the two or more holes 218 along the extension member 210 and the spring-loaded projection 445 may serve to provide intermediate stoppages as the extension member 210 is being extended or drawn out from the controller body 304 so as to avoid the extension member 210 from being pulled out from the controller body 304 all at once. According to various embodiments, the spring-loaded projection 445 may include a ball or a rounded-tip pin or a finger-like projection placed on a spring.

Figure 5A:
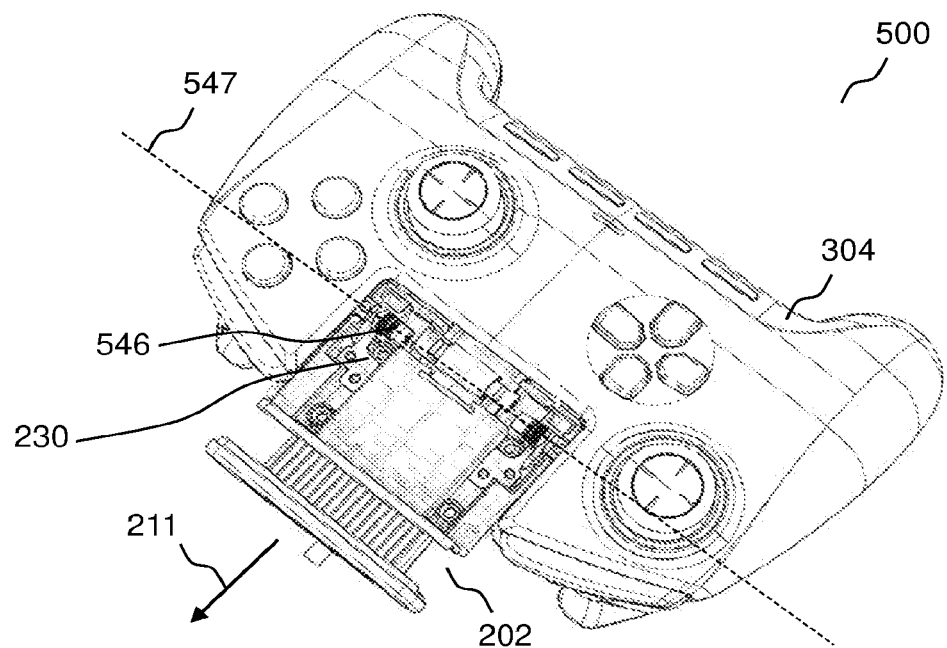
FIG. 5A and FIG. 5B show a controller with the extendable mechanism of FIG. 2 configured to be pivotable according to various embodiments.
Figure 5B:
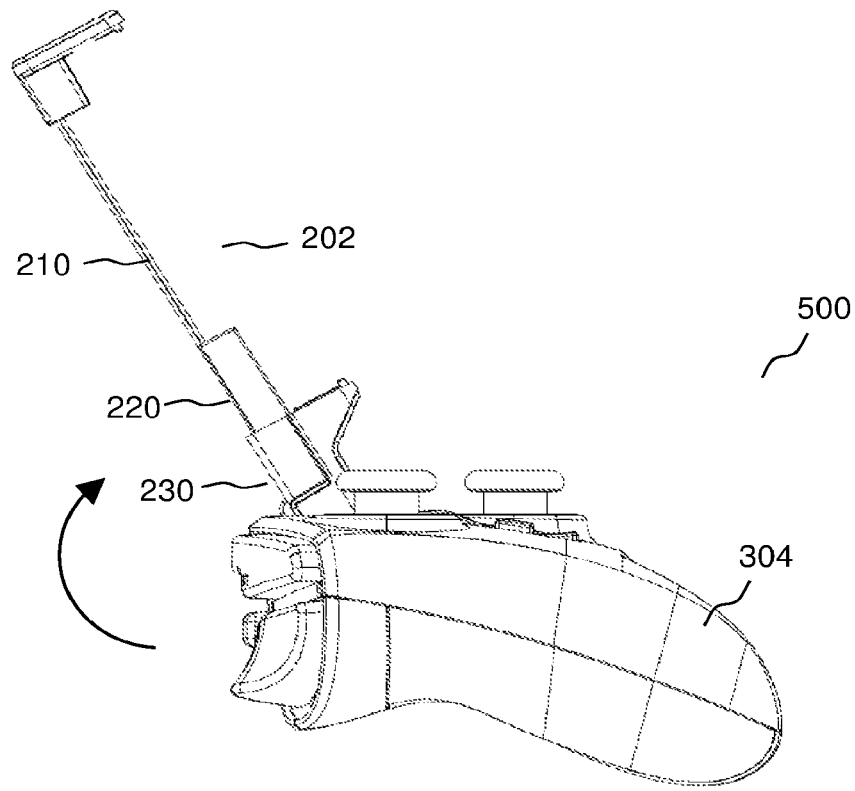

FIG. 5A and FIG. 5B show a controller 500 with the extendable mechanism 202 of FIG. 2 configured to be pivotable according to various embodiments. As shown, according to various embodiments, the hinge joint 546 may couple the link-member-guide element 230 of the extendable mechanism 202 to the controller body 304 such that the link-member-guide element 230 may be pivotable about a pivot-axis 547 perpendicular to the extension direction 211 of the extension member 210 of the extendable mechanism 202 to incline the link-member-guide element 230 with respect to the controller body 304. Accordingly, the link-member-guide element 230 of the extendable mechanism 202 may be pivotable with respect to the controller body 304 about the hinge joint 546. According to various embodiments, the hinge joint 546 may include a hinge, or a spring-loaded hinge. According to various embodiments, the link-member-guide element 230 may be configured to be inclined with respect to a main surface of controller body 304, wherein the main surface is a surface of the controller body 304 with the control buttons and/or joysticks. According to various embodiments, when a length of the extension member 210 of the extendable mechanism 202 and/or a length of the link member 220 of the extendable mechanism 202 are/is longer than a length of the link-member-guide element 230, the extension member 210 and/or the link member 220 may be required to be extended or drawn out with respect to the controller body 304 before the link-member-guide element 230 may be pivoted so as to be inclined with respect to the controller body 304. Accordingly, when the link-member-guide element 230 is pivoted to be inclined with respect to the controller body 304, the extendable mechanism 202 may be inclined with respect to the controller body 304 as shown in FIG. 5B.

FIG. 6A shows a schematic diagram of an extendable mechanism 602 in a retracted state according to various embodiments. FIG. 6B shows a schematic diagram of the extendable mechanism 602 of FIG. 6A in an extended state according to various embodiments. According to various embodiments, the extendable mechanism 602 may be for being arranged between a first part 603 of a body structure 604 and a second part 605 of the body structure 604. As shown, one end of the extendable mechanism 602 may be for being mounted or secured or attached or coupled to the first part 603 of the body structure 604, and another end of the extendable mechanism 602 may be for being mounted or secured or attached or coupled to the second part 605 of the body structure 604. The extendable mechanism 602 may serve to provide an extendable link or bridge between the first part 603 of the body structure 604 and the second part 605 of the body structure 604. According to various embodiments, the second part 605 of the body structure 604 may be a main part of the body structure 604 and the first part 603 of the body structure 604 may be an auxiliary part of the body structure 604. Accordingly, in the following description, an extension direction 611 of the extendable mechanism 602 may refer to a direction in which the first part 603 (or the auxiliary part) of the body structure 604 may be moved relatively away from the second part 605 (or the main part) of the body structure 604 (i.e. assuming the second part 605 of the body structure 604 is stationary while the first part 603 of the body structure 604 may be moved away from the second part 605 of the body structure). It should be understood that the relative movements are described in this manner to aid understanding of relative movement directions and are not intended to limit the movement directions of the extendable mechanism 602. In FIG. 6A and FIG. 6B, an outline of the first part 603 and the second part 605 of the body structure 604 are illustrated by dotted-lines. According to various embodiments, first part 603 and the second part 605 of the body structure 604 may be of any shape or size or configuration depending on what is the device embodied by the body structure 604. The body structure 604 as shown in FIG. 6A and FIG. 6B is provided by way of example only and not limitation. According to various embodiments, the body structure 604 may be a body of a game controller wherein a mobile phone or a personal electronic device may be sandwiched between the first part 603 of the body structure 604 and the second part 605 of the body structure 604.

Referring to FIG. 6A and FIG. 6B, the extendable mechanism 602 between the first part 603 (or the auxiliary part) of the body structure 604 and the second part 605 (or the main part) of the body structure 604 may include an extension member 610 according to various embodiments. The extension member 610 may be shaped or dimensioned or configured such that it may be for being concealed or contained or kept or held within the body structure 604 in the retracted state of the extendable mechanism 602, and may be for being extended between the first part 603 of the body structure 604 and the second part 605 of the body structure 604 in the extended state of the extendable mechanism 602.

The extension member 610 may serve to be a part of the extendable mechanism 602 that may be a physically extension between the first part 603 of the body structure 604 and the second part 605 of the body structure 604. According to various embodiments, the extendable member 610 may be of an elongate shape. For example, the extendable member 610 may be an elongate plate or an elongate panel. Accordingly, the first part 603 of the body structure 604 may be extendable from the second part 605 of the body structure 604 via the extendable mechanism 602 in a lengthwise direction along a longitudinal axis 612 of the extendable member 610.

According to various embodiments, the extendable mechanism 602 may further include a first link member 620a (or an auxiliary link member) which may be provided with a first extension-member-guide element 622a (or an auxiliary extension-member-guide element). The first extension-member-guide element 622a may be configured for guiding a relative movement of the first link member 620a with respect to the extension member 610. According to various embodiments, the extension member 610 may be in engagement with the first extension-member-guide element 622a of the first link member 620a in a manner such that the first link member 620a may be retractably movable relative to the extension member 610 in the extension direction 611 of the extendable mechanism 602 along the axis of the extension member 610. Accordingly, the first extension-member-guide element 622a may guide a relative movement between the first link member 620a and the extension member 610 of the extendable mechanism 602 such that the first link member 620a may be movable relative to the extension member 610. According to various embodiments, when the extension member 610 is of an elongate shape, the extension direction 611 of the extendable mechanism 602 may be along the longitudinal axis 612 of the elongate extension member 610. According to various embodiments, the first extension-member-guide element 622a of the first link member 620a may be a separate part from a first link body 624a of the first link member 620a. Accordingly, the first extension-member-guide element 622a and the first link body 624a may be two separate parts fixedly coupled or joined or connected or attached to each other so as to form the first link member 620a. According to various other embodiments, the first extension-member-guide element 622a and the first link body 624a may also be integrally molded or formed as a single unitary piece to form the first link member 620a.

According to various embodiments, the extendable mechanism 602 may further include a first-link-member-guide element 630a (or an auxiliary-link-member-guide element). The first-link-member-guide element 630a may be for being disposed at the first part 603 of the body structure 604. Accordingly, the first-link-member-guide element 630a may be a separate part from the first part 603 of the body structure 604, whereby the first-link-member-guide element 630a may be for being attached or coupled or fixed or joined or connected to the first part 603 of the body structure 604, or an integral portion of first part 603 of the body structure 604, whereby the first-link-member-guide element 630a may be integrally molded or formed with the first part 603 of the body structure 604 as a single unitary piece. According to various embodiments, the first link member 620a may be in engagement with the first-link-member-guide element 630a in a manner such that the first-link-member-guide element 630a may be retractably movable relative to the first link member 620a in the extension direction 611 of the extendable mechanism 602. Accordingly, the first-link-member-guide element 630a may move relative to the first link member 620a. The relative movement between the first-link-member-guide element 630a and the first link member 620a may be parallel to the relative movement between the first link member 620a and the extension member 610.

According to various embodiments, the extendable mechanism 602 may further include a first biasing member 640a (or an auxiliary biasing member). The first biasing member 640a may be for being arranged between the first link member 620a and the first part 603 of the body structure 604. According to various embodiments, the first biasing member 640a may serve to apply a biasing force on the first link member 620a in the extension direction 611 of the extension member 610. Accordingly, the first biasing member 640a may serve to provide a pulling force on the first link member 620a such that the pulling force may move the first link member 620a relative to the extension member 610 in the extension direction. Further, as the first biasing member 640a may be between the first link member 620a and the first part 603 of the body structure 604, the biasing force of the biasing member 640a may be against the relative movement between the first-link-member-guide element 630a and the first link member 620a. According to various embodiments, the first biasing member 640a may include a tape spring, a clock spring, a coil spring, a torsion spring, a compression spring, a tension spring, or any combination thereof.

According to various embodiments, the extendable mechanism 602 may further include a second link member 620b (or a main link member) which may be provided with a second extension-member-guide element 622b (or a main extension-member-guide element). The second extension-member-guide element 622b may be configured for guiding a relative movement of the extension member 610 with respect to the second link member 620b. According to various embodiments, the extension member 610 may be in engagement with the second extension-member-guide element 622b of the second link member 620b in a manner such that the extension member 610 may be retractably movable relative to the second link member 620b in the extension direction 611 of the extendable mechanism 602 along the axis of the extension member 610. Accordingly, the second extension-member-guide element 622b may guide a relative movement between the extension member 610 and the second link member 620b such that the extension member 610 may be movable relative to the second link member 620b. According to various embodiments, when the extension member 610 is of an elongate shape, the extension direction 611 of the extendable mechanism 602 may be along the longitudinal axis 612 of the elongate extension member 610. According to various embodiments, the second extension-member-guide element 622b of the second link member 620b may be a separate part from a second link body 624b of the second link member 620b. Accordingly, the second extension-member-guide element 622b and the second link body 624b may be two separate parts fixedly coupled or joined or connected or attached to each other so as to form the second link member 620b. According to various other embodiments, the second extension-member-guide element 622b and the second link body 624b may also be integrally molded or formed as a single unitary piece to form the second link member 620b.

According to various embodiments, the extendable mechanism 602 may further include a second-link-member-guide element 630b (or a main-link-member-guide element). The second-link-member-guide element 630b may be for being disposed at the second part 605 of the body structure 604. Accordingly, the second-link-member-guide element 630b may be a separate part from the second part 605 of the body structure 604, whereby the second-link-member-guide element 630b may be for being attached or coupled or fixed or joined or connected to the second part 605 of the body structure 604, or an integral portion of second part 605 of the body structure 604, whereby the second-link-member-guide element 630b may be integrally molded or formed with the second part 605 of the body structure 604 as a single unitary piece. According to various embodiments, the second-link-member-guide element 630b may be in engagement with the second link-member 620b in a manner such that the second link member 620b may be retractably movable relative to the second-link-member-guide element 630b in the extension direction 611 of the extendable mechanism 602. Accordingly, the second link member 620b may move relative to the second-link-member-guide element 630b. The relative movement between the second link member 620b and the second-link-member-guide element 630b may be parallel to the relative movement between the extension member 610 and the second link member 620b.

According to various embodiments, the extendable mechanism 602 may further include a second biasing member 640b (or a main biasing member). The second biasing member 640b may be for being arranged between the second link member 620b and the second part 605 of the body structure 604. According to various embodiments, the second biasing member 640b may serve to apply a biasing force on the second link member 620b in a direction opposite to the extension direction 611 of the extendable mechanism 602. Accordingly, the second biasing member 640b may serve to provide a retraction force, which may be against the extension movement of the second link member 620b from the second-link-member-guide element 630b, for retracting the second link member 620b towards the second part 605 of the body structure 604. According to various embodiments, the second biasing member 640b may include a tape spring, a clock spring, a coil spring, a torsion spring, a compression spring, a tension spring, or any combination thereof.

According to various embodiments, the extension member 610 of the extendable mechanism 602 may serve as a primary extension of the extendable mechanism 602 between the first part 603 of the body structure 604 and the second part 605 of the body structure 604. According to various embodiments, the first link member 620a and the second link member 620b may serve as secondary extensions from the extension member 610 of the extendable mechanism 602. According to various embodiments, the extension member 610 and the first link member 620a may be arranged in an overlapping or a stacked configuration. The extension member 610 and the second link member 620b may also be arranged in an overlapping or a stacked configuration. Accordingly, when the extendable mechanism 602 is in the retracted state, each of the first link member 620a and the second link member 620b may extend over and cover respective portions of the extension member 610. Hence, the extendable mechanism 602 may provide a compact mechanism with overlapping or stacked extensions for the body structure 604.

According to various embodiments, the extension member 610 may include at least two stopper elements 614a and 614b, one stopper element 614a, 614b at each end of the extension member 610. According to various embodiments, each of the stopper elements 614a, 614b may include a protrusion projecting at least substantially perpendicular from the extension member 610 so as to provide a physical barrier or limit between the extension member 610 and the respective first and second extension-member-guide element 622a, 622b of the respective first and second link member 620a, 620b for preventing the extension member 610 from being pulled out or separated from the respective first and second extension-member-guide element 622a, 622b of the first and second link member 620a, 620b. Accordingly, the respective stopper element 614a, 614b may fix or set a maximum relative movable distance between the extension member 610 and the respective first and second extension-member-guide element 622a, 622b of the respective first and second link member 620a, 620b.

According to various embodiments, the extendable mechanism 602 may be free of biasing member between the first link member 620a and the extension member 610. Accordingly, the extendable mechanism 602 may be free of a biasing force being applied to retract the first link member 620a relative to the extension member 610. According to various embodiments, the extendable mechanism 602 may also be free of biasing member between the extension member 610 and the second link member 620b. Accordingly, the extendable mechanism 602 may be free of a biasing force being applied to retract the extension member 610 relative to the second link member 620b. Hence, a user may easily pull apart the first part 603 of the body structure 604 from the second part 605 of the body structure 604 via the extendable mechanism 602 in a first stage such that the extension member 610 may be fully extended between the first link member 620a and the second link member 620b. Subsequently, with the extension member 610 fully extended between the first link member 620a and the second link member 620b, the user may then apply a force to pull apart the first part 603 of the body structure 604 from the second part 605 of the body structure 604 so as to overcome the respective biasing forces applied on the first link member 620a and the second link member 620b in order to further extend the extendable mechanism 602 such that an object (e.g. mobile phone or personal electronic device) may be placed between first part 603 of the body structure 604 and the second part 605 of the body structure 604. Accordingly, the object may be retained between the first part 603 of the body structure 604 and the second part 605 of the body structure 604 by the biasing forces acting on the respective first and second link member 620a, 620b.

According to various embodiments, the extension member 610 may be engaged with the first extension-member-guide element 622a of the first link member 620a and the second extension-member-guide element 622b of the second link member 620b via tongue and groove sliding engagements. Accordingly, the extension member 610 may include a pair of tongue projections along opposite side edges of the extension member 610 parallel to the extension direction 611 of the extendable mechanism 602. The first extension-member-guide element 622a of the first link member 620a may include a pair of grooves facing towards each other and parallel to the extension direction 611 of the extension member 110. The second extension-member-guide element 622b of the second link member 620b may include a pair of grooves facing towards each other and parallel to the extension direction 611 of the extension member 610. Accordingly, the pair of grooves of the first extension-member-guide element 622a of the first link member 620a may be engaged with the respective tongue projections of the extension member 610 so as to be slidable relative to the respective tongue projections of the extension member 610. The tongue projections of the extension member 610 may then be engaged with the respective grooves of the second extension-member-guide element 622b of the second link member 620a so as to be slidable relative to the respective grooves of the second extension-member-guide element 622b of the second link member 620a. According to various other embodiments, the extension member 610 may include a pair of grooves along opposite side edges of the extension member 610 parallel to the extension direction 611 of the extendable mechanism 602. The first extension-member-guide element 622a of the first link member 620a may include a pair of tongue projections directed towards each other and parallel to the extension direction 611 of the extension member 110. The second extension-member-guide element 622b of the second link member 620b may include a pair of tongue projections directed towards each other and parallel to the extension direction 611 of the extension member 610. Accordingly, the pair of tongue projections of the first extension-member-guide element 622a of the first link member 620a may be engaged with the respective grooves of the extension member 610 so as to be slidable relative to the respective grooves of the extension member 610. The pair of grooves of the extension member 610 may then be engaged with the respective tongue projections of the second extension-member-guide element 622b of the second link member 620a so as to be slidable relative to the respective tongue projections of the second extension-member-guide element 622b of the second link member 620a. According to various embodiments, the tongue and groove sliding engagement may include a protrusion and groove sliding arrangement, or a dovetail tongue and groove sliding arrangement, or a T-shaped tongue and groove sliding arrangement, or a J-shaped tongue and groove sliding arrangement, or an L-shaped tongue and groove sliding arrangement, or a hooked-like tongue and groove sliding arrangement, or any other suitable sliding arrangement.

According to various embodiments, the first link member 620a and the first link-member-guide element 630a may be engaged in a tongue and groove sliding engagement. Accordingly, the first link member 620a may include a pair of tongue projections extending along opposite side edges of the first link member 620a parallel to the extension direction 611 of the extension member 610, and the first link-member-guide element 630a may include a pair of grooves facing towards each other and parallel to the extension direction 611 of the extension member 610. Accordingly, the pair of tongue projections of the first link member 620a and the pair of grooves of the first link-member-guide element 630a may be configured to engage such that the respective tongue projections are slidable relative to the corresponding groove. According to various other embodiments, the first link member 620a may include a pair of grooves extending along opposite side edges of the first link member 620a parallel to the extension direction 611 of the extension member 610, and the first link-member-guide element 630a may include a pair of tongue projections directed towards each other and parallel to the extension direction 611 of the extension member 610. Accordingly, the pair of grooves of the first link member 620a and the pair of tongue projections of the first link-member-guide element 630a may be configured to engage with each other such that respective tongue projections are slidable relative to the corresponding groove. According to various embodiments, the tongue and groove sliding engagement may include a protrusion and groove sliding arrangement, or a dovetail tongue and groove sliding arrangement, or a T-shaped tongue and groove sliding arrangement, or a J-shaped tongue and groove sliding arrangement, or an L-shaped tongue and groove sliding arrangement, or a hooked-like tongue and groove sliding arrangement, or any other suitable tongue and groove sliding arrangement.

According to various embodiments, the second link member 620b and the second link-member-guide element 630b may be engaged in a tongue and groove sliding engagement. Accordingly, the second link member 620b may include a pair of tongue projections extending along opposite side edges of the second link member 620b parallel to the extension direction 611 of the extension member 610, and the second link-member-guide element 630b may include a pair of grooves facing towards each other and parallel to the extension direction 611 of the extension member 610. Accordingly, the pair of tongue projections of the second link member 620b and the pair of grooves of the second link-member-guide element 630b may be configured to engage such that the respective tongue projections are slidable relative to the corresponding groove. According to various other embodiments, the second link member 620b may include a pair of grooves extending along opposite side edges of the second link member 620b parallel to the extension direction 611 of the extension member 610, and the second link-member-guide element 630b may include a pair of tongue projections directed towards each other and parallel to the extension direction 611 of the extension member 610. Accordingly, the pair of grooves of the second link member 620b and the pair of tongue projections of the second link-member-guide element 630b may be configured to engage with each other such that respective tongue projections are slidable relative to the corresponding groove. According to various embodiments, the tongue and groove sliding engagement may include a protrusion and groove sliding arrangement, or a dovetail tongue and groove sliding arrangement, or a T-shaped tongue and groove sliding arrangement, or a J-shaped tongue and groove sliding arrangement, or an L-shaped tongue and groove sliding arrangement, or a hooked-like tongue and groove sliding arrangement, or any other suitable tongue and groove sliding arrangement.

Figure 7:
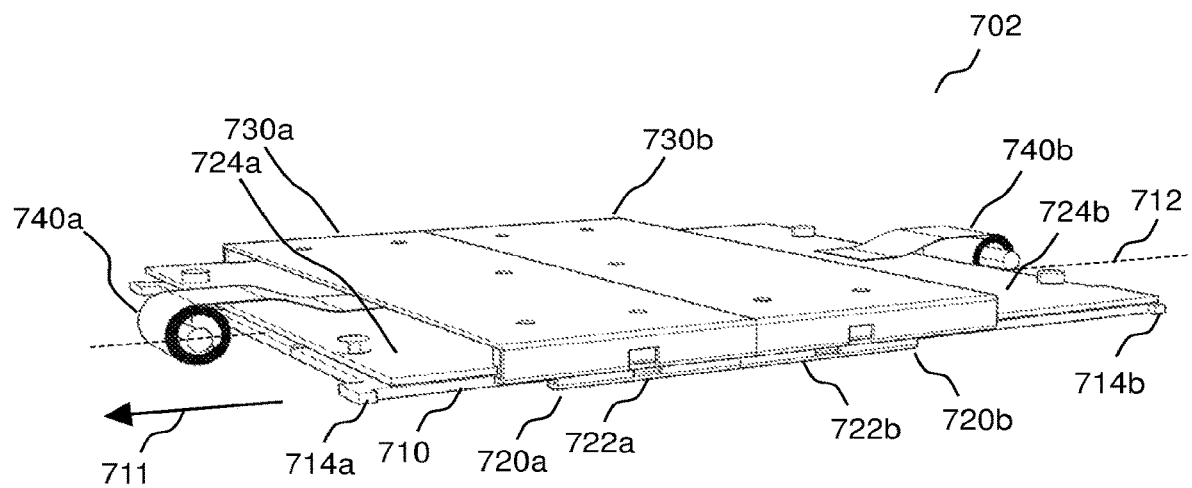
FIG. 7 shows an extendable mechanism according to various embodiments.

FIG. 7 shows an extendable mechanism 702 according to various embodiments. As shown, the extendable mechanism 702 may include an extension member 710 according to various embodiments. According to various embodiments, the extendable member 710 may be of an elongate shape, such as an elongate plate or an elongate panel.

As shown, according to various embodiments, the extendable mechanism 702 may further include a first link member 720a which may be provided with a first extension-member-guide element 722a. The first extension-member-guide element 722a may be configured for guiding a relative movement of the first link member 720a with respect to the extension member 710. According to various embodiments, the extension member 710 may be in engagement with the first extension-member-guide element 722a of the first link member 720a in a manner such that the first link member 720a may be retractably movable relative to the extension member 710 in the extension direction 711 of the extendable mechanism 702 along the longitudinal axis 712 of the extension member 710. Accordingly, the first extension-member-guide element 722a may guide a relative movement between the first link member 720a and the extension member 710 of the extendable mechanism 702 such that the first link member 720a may be movable relative to the extension member 710. According to various embodiments, the first extension-member-guide element 722a of the first link member 720a may be a separate part from a first link body 724a of the first link member 720a. Accordingly, the first extension-member-guide element 722a and the first link body 724a may be two separate parts fixedly coupled or joined or connected or attached to each other so as to form the first link member 720a.

According to various embodiments, the extendable mechanism 702 may further include a first-link-member-guide element 730a. The first-link-member-guide element 730a may be for being disposed at a first part of a body structure. As shown, according to various embodiments, the first-link-member-guide element 730a may be a separate part from the first part of the body structure. Accordingly, the first-link-member-guide element 730a may be for being attached or coupled or fixed or joined or connected to the first part of the body structure. According to various embodiments, the first link member 720a may be in engagement with the first-link-member-guide element 730a in a manner such that the first-link-member-guide element 730a may be retractably movable relative to the first link member 720a in the extension direction 711 of the extendable mechanism 702. Accordingly, the first-link-member-guide element 730a may move relative to the first link member 720a. The relative movement between the first-link-member-guide element 730a and the first link member 720a may be parallel to the relative movement between the first link member 720a and the extension member 710.

As shown, according to various embodiments, the extendable mechanism 702 may further include a first biasing member 740a. The first biasing member 740a may be for being arranged between the first link member 720a and the first part of the body structure. According to various embodiments, the first biasing member 740a may serve to apply a biasing force on the first link member 720a in the extension direction 711 of the extension member 710. Accordingly, the first biasing member 740a may serve to provide a pulling force on the first link member 720a such that the pulling force may move the first link member 720a relative to the extension member 710 in the extension direction. Further, as the first biasing member 740a may be between the first link member 720a and the first part of the body structure, the biasing force of the biasing member 740a may be against the relative movement between the first-link-member-guide element 730a and the first link member 720a. As shown, according to various embodiments, the first biasing member 740a may include a tape spring, or a clock spring.

As shown, according to various embodiments, the extendable mechanism 702 may further include a second link member 720b which may be provided with a second extension-member-guide element 722b. The second extension-member-guide element 722b may be configured for guiding a relative movement of the extension member 710 with respect to the second link member 720b. According to various embodiments, the extension member 710 may be in engagement with the second extension-member-guide element 722b of the second link member 720b in a manner such that the extension member 710 may be retractably movable relative to the second link member 720b in the extension direction 711 of the extendable mechanism 702 along the longitudinal axis 712 of the extension member 710. Accordingly, the second extension-member-guide element 722b may guide a relative movement between the extension member 710 and the second link member 720b such that the extension member 710 may be movable relative to the second link member 720b. According to various embodiments, the second extension-member-guide element 722b of the second link member 720b may be a separate part from a second link body 724b of the second link member 720b.

Accordingly, the second extension-member-guide element 722b and the second link body 724b may be two separate parts fixedly coupled or joined or connected or attached to each other so as to form the second link member 720b.

According to various embodiments, the extendable mechanism 702 may further include a second-link-member-guide element 730b. The second-link-member-guide element 730b may be for being disposed at a second part of the body structure. As shown, according to various embodiments, the second-link-member-guide element 730b may be a separate part from the second part of the body structure. Accordingly, the second-link-member-guide element 730b may be for being attached or coupled or fixed or joined or connected to the second part of the body structure. According to various embodiments, the second-link-member-guide element 730b may be in engagement with the second link-member 720b in a manner such that the second link member 720b may be retractably movable relative to the second-link-member-guide element 730b in the extension direction 711 of the extendable mechanism 702. Accordingly, the second link member 720b may move relative to the second-link-member-guide element 730b. The relative movement between the second link member 720b and the second-link-member-guide element 730b may be parallel to the relative movement between the extension member 710 and the second link member 720b.

As shown, according to various embodiments, the extendable mechanism 702 may further include a second biasing member 740b. The second biasing member 740b may be for being arranged between the second link member 720b and the second part of the body structure. According to various embodiments, the second biasing member 740b may serve to apply a biasing force on the second link member 720b in a direction opposite to the extension direction 711 of the extendable mechanism 702. Accordingly, the second biasing member 740b may serve to provide a retraction force, which may be against the extension movement of the second link member 720b from the second-link-member-guide element 730b, for retracting the second link member 720b towards the second part of the body structure. As shown, according to various embodiments, the second biasing member 740b may include a tape spring or a clock spring.

According to various embodiments, the extension member 710 of the extendable mechanism 702 may serve as a primary extension of the extendable mechanism 702. According to various embodiments, the first link member 720a and the second link member 720b may serve as secondary extensions from the extension member 610 of the extendable mechanism 702. According to various embodiments, the extension member 710 and the first link member 720a may be arranged in an overlapping or a stacked configuration. The extension member 710 and the second link member 720b may also be arranged in an overlapping or a stacked configuration. Accordingly, when the extendable mechanism 702 is in the retracted state, each of the first link member 720a and the second link member 720b may extend over and cover respective portions of the extension member 710. Hence, the extendable mechanism 702 may provide a compact mechanism with overlapping or stacked extensions.

As shown, according to various embodiments, the extension member 710 may include at least two stopper elements 714a and 714b, one stopper element 714a, 714b at each end of the extension member 710. According to various embodiments, each of the stopper elements 714a, 714b may include a protrusion projecting at least substantially perpendicular from the extension member 710 so as to provide a physical barrier or limit between the extension member 710 and the respective first and second extension-member-guide element 722a, 722b of the respective first and second link member 720a, 720b for preventing the extension member 710 from being pulled out or separated from the respective first and second extension-member-guide element 722a, 722b of the first and second link member 720a, 720b. Accordingly, the respective stopper element 714a, 714b may fix or set a maximum relative movable distance between the extension member 710 and the respective first and second extension-member-guide element 722a, 722b of the respective first and second link member 720a, 720b.

According to various embodiments, the extendable mechanism 702 may be free of biasing member between the first link member 720a and the extension member 710. Accordingly, the extendable mechanism 702 may be free of a biasing force being applied to retract the first link member 720a relative to the extension member 710. According to various embodiments, the extendable mechanism 702 may also be free of biasing member between the extension member 710 and the second link member 720b. Accordingly, the extendable mechanism 702 may be free of a biasing force being applied to retract the extension member 710 relative to the second link member 720b. Hence, a user may easily pull apart the extendable mechanism 702 in a first stage such that the extension member 710 may be fully extended between the first link member 720a and the second link member 720b. Subsequently, with the extension member 710 fully extended between the first link member 720a and the second link member 720b, the user may then apply a force to overcome the respective biasing forces applied on the first link member 720a and the second link member 720b in order to further extend the extendable mechanism 702.

According to various embodiments, the extension member 710 may be engaged with the first extension-member-guide element 722a of the first link member 720a and the second extension-member-guide element 722b of the second link member 720b via tongue and groove sliding engagements. Accordingly, the extension member 710 may include a pair of tongue projections along opposite side edges of the extension member 710 parallel to the extension direction 711 of the extendable mechanism 702. The first extension-member-guide element 722a of the first link member 720a may include a pair of grooves facing towards each other and parallel to the extension direction 711 of the extension member 710. The second extension-member-guide element 722b of the second link member 720b may include a pair of grooves facing towards each other and parallel to the extension direction 711 of the extension member 710. Accordingly, the pair of grooves of the first extension-member-guide element 722a of the first link member 720a may be engaged with the respective tongue projections of the extension member 710 so as to be slidable relative to the respective tongue projections of the extension member 710. The tongue projections of the extension member 610 may then be engaged with the respective grooves of the second extension-member-guide element 722b of the second link member 720a so as to be slidable relative to the respective grooves of the second extension-member-guide element 722b of the second link member 720a.

According to various embodiments, the first link member 720a and the first link-member-guide element 730a may be engaged in a tongue and groove sliding engagement. Accordingly, the first link member 720a may include a pair of tongue projections extending along opposite side edges of the first link member 720a parallel to the extension direction 711 of the extension member 710, and the first link-member-guide element 730a may include a pair of grooves facing towards each other and parallel to the extension direction 711 of the extension member 710. Accordingly, the pair of tongue projections of the first link member 720a and the pair of grooves of the first link-member-guide element 730a may be configured to engage such that the respective tongue projections are slidable relative to the corresponding groove.

According to various embodiments, the second link member 720b and the second link-member-guide element 730b may be engaged in a tongue and groove sliding engagement. Accordingly, the second link member 720b may include a pair of tongue projections extending along opposite side edges of the second link member 720b parallel to the extension direction 711 of the extension member 710, and the second link-member-guide element 730b may include a pair of grooves facing towards each other and parallel to the extension direction 711 of the extension member 710. Accordingly, the pair of tongue projections of the second link member 720b and the pair of grooves of the second link-member-guide element 730b may be configured to engage such that the respective tongue projections are slidable relative to the corresponding groove.

Figure 8:
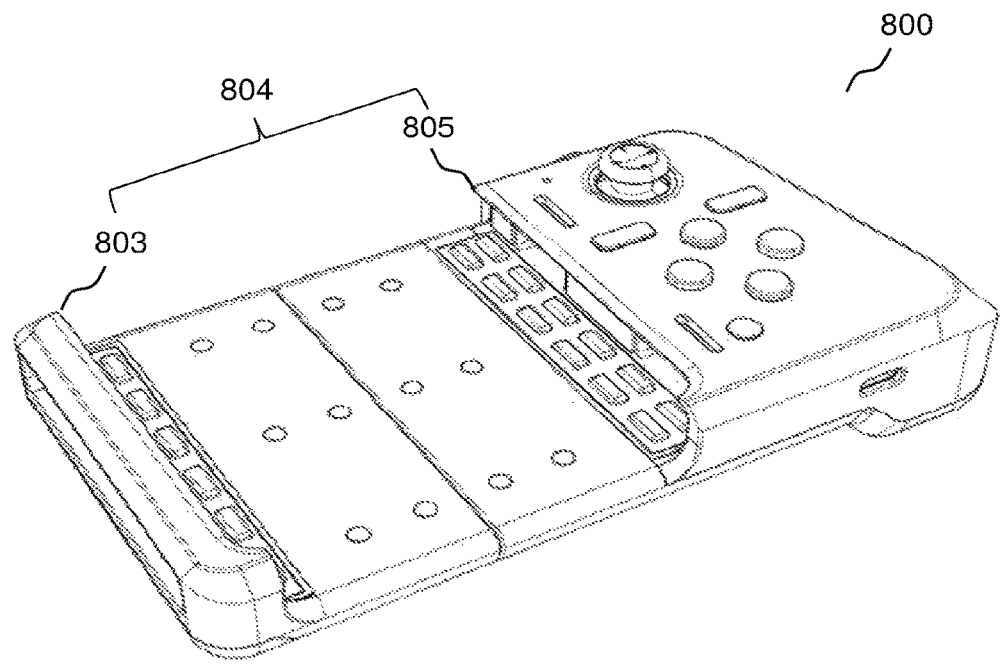
FIG. 8 shows a controller with the extendable mechanism of FIG. 7 according to various embodiments.

FIG. 8 shows a controller 800 with the extendable mechanism 702 of FIG. 7 according to various embodiments. As shown in FIG. 8, according to various embodiments, the controller 800 may include a controller body 804 having a first part 803 (or an auxiliary part) and a second part 805 (or a main part). The extendable mechanism 702 may be disposed within or inside the controller body 804. Accordingly, the extendable mechanism 702 may be mounted or secured or attached or coupled to an interior of the controller body 804. According to various embodiments, the extendable mechanism 702 may serve to provide an extension link or bridge between the first part 803 of the controller body 804 and the second part 805 of the controller body 804. Accordingly, while the extendable mechanism 702 may be within the controller body 804 in the retracted state, the extendable mechanism 702 may be exposed and extended between the first part 803 of the controller body 804 and the second part 805 of the controller body 804 in the extended state. According to various embodiments, the extendable mechanism 702 may be disposed at any locations of the controller body 804 depending on the configuration of the controller body 804. The controller 800 as shown in FIG. 8 is provided by way of example only and not limitation.

FIG. 9A shows a cross sectional view of the controller 800 of FIG. 8 with the extendable mechanism 702 of FIG. 7 in a retracted state according to various embodiments. FIG. 9B shows a cross sectional view of the controller 800 of FIG. 8 with the extendable mechanism 702 of FIG. 7 in an extended state according to various embodiments.

As shown, according to various embodiments, the controller 800 may include the controller body 804 having the first part 803 and the second part 805, and the extendable mechanism 702 of FIG. 7 disposed between the first part 803 of the controller body 804 and the second part 805 of the controller body. As previously described, the extendable mechanism may include the extension member 710, the first link member 720a, the first-link-member-guide element 730a, the first biasing member 740a, the second link member 720b, the second-link-member-guide element 730b, and the second biasing member 740b.

As shown in FIGS. 9A and 9B, according to various embodiments the first-link-member-guide element 730a of the extendable mechanism 702 may be disposed at the first part 803 of the controller body 804. According to various embodiments, the first-link-member-guide element 730a of the extendable mechanism 702 may be mounted or secured or fixed or attached or coupled to an interior portion of the first part 803 of the controller body 804 such that the first-link-member-guide element 730a may be fixed (or non-movable relative) to the first part 803 of the controller body 804. Accordingly, with the first-link-member-guide element 730a of the extendable mechanism 702 fixed to the first part 803 of the controller body 804, the first part 803 of the controller body 804 may be movable relative to the first link member 720a of the extendable mechanism 702.

As shown in FIGS. 9A and 9B, according to various embodiments the second-link-member-guide element 730b of the extendable mechanism 702 may be disposed at the second part 805 of the controller body 804. According to various embodiments, the second-link-member-guide element 730b of the extendable mechanism 702 may be mounted or secured or fixed or attached or coupled to an interior portion of the second part 805 of the controller body 804 such that the second-link-member-guide element 730b may be fixed (or non-movable relative) to the second part 805 of the controller body 804. Accordingly, with the second-link-member-guide element 730b of the extendable mechanism 702 fixed to the second part 805 of the controller body 804, the second link member 720b of the extendable mechanism 702 may be extendable relative to the second part 805 of the controller body 804.

As shown, according to various embodiments, the first biasing member 740a of the extendable mechanism 702 may be arranged between the first link member 720a of the extendable mechanism 702 and the first part 803 of the controller body 804. According to various embodiments, one end of the first biasing member 740a may be coupled to the first link member 720a of the extendable mechanism 702 and another end of the first biasing member 740a may be coupled to the first part 803 of the controller body 804. According to various embodiments, the second biasing member 740b of the extendable mechanism 702 may be arranged between the second link member 720b of the extendable mechanism 702 and the second part 805 of the controller body 804. According to various embodiments, one end of the second biasing member 740b may be coupled to the second link member 720b of the extendable mechanism 702 and another end of the second biasing member 740b may be coupled to the first part 803 of the controller body 804. According to various embodiments, the extendable mechanism 702 may be free of biasing member between the extension member 710 and the first link member 720a as well as between the extension member 710 and the second link member 720b. Accordingly, a user may easily pull apart the first part 803 of the controller body 804 and the second part 805 of the controller body 804 during the first stage via pulling apart the extendable mechanism 702 to extend the extension member 710 between the first link member 720a and the second link member 720b. Subsequently, with the extension member 710 fully extended between the first link member 720a and the second link member 720b, the user may then apply a force to the extension member 710 so as to overcome the biasing forces applied on the respective first and second link member 720a, 720b in order to further extend the extendable mechanism 702 such that an object (e.g. mobile phone or personal electronic device) may be placed between the first part 803 of the controller body 804 and the second part 805 of the controller body 804. Accordingly, the object may be retained between the first part 803 of the controller body 804 and the second part 805 of the controller body 804 by the respective biasing forces acting on the respective first and second link member 720a, 720b of the extendable mechanism 702.

The following examples pertain to various embodiments.

Example 1 is an extendable mechanism for a body structure, including:
an extension member;
a link member which is provided with an extension-member-guide element, wherein the extension member is in engagement with the extension-member-guide element of the link member in a manner so as to be retractably extendable from the link member in an extension direction along an axis of the extension member;
a link-member-guide element for being disposed at the body structure, wherein the link member is in engagement with the link-member-guide element in a manner so as to be retractably extendable from the link-member-guide element in the extension direction; and
a biasing member for being arranged between the link member and the body structure.

In Example 2, the subject matter of Example 1 may optionally include that the extension member may include a stopper element at an end of the extension member opposite the extension direction.

In Example 3, the subject matter of Example 1 or 2 may optionally include that the extension member and the extension-member-guide element may be engaged in a tongue and groove sliding engagement. The extension member may include a pair of tongue projections along opposite side edges of the extension member parallel to the axis of the extension member. The extension-member-guide element may include a pair of grooves facing towards each other and parallel to the extension direction.

In Example 4, the subject matter of any one of Examples 1 to 3 may optionally include that the link member and the link-member-guide element may be engaged in a tongue and groove sliding engagement. The link member may include a pair of tongue projections along opposite side edges of the link member parallel to the extension direction. The link-member-guide element may include a pair of grooves facing towards each other and parallel to the extension direction.

In Example 5, the subject matter of any one of Examples 1 to 4 may optionally include that the link member and the extension member may be arranged in an overlapping configuration.

In Example 6, the subject matter of any one of Examples 1 to 5 may optionally include that the biasing member may include a tape spring, a clock spring, a coil spring, a torsion spring, a compression spring, a tension spring, or any combination thereof.

In Example 7, the subject matter of any one of Examples 1 to 6 may optionally include that the extension-member-guide element of the link member may be a separate part fixedly coupled to a link body of the link member.

In Example 8, the subject matter of any one of Examples 1 to 7 may optionally include that the extension member may include two or more holes lined along a length of the extension member at regular interval.

In Example 9, the subject matter of Example 8 may optionally include a spring-loaded projection for being disposed at the body structure to cooperate with the two or more holes of the extension member as the extension member is being extended from the body structure.

In Example 10, the subject matter of any one of Examples 1 to 9 may optionally include that the link-member-guide element may be pivotable about a pivot-axis perpendicular to the extension direction to incline the link-member-guide element with respect to the body structure.

In Example 11, the subject matter of any one of Examples 1 to 7 may optionally include that the body structure may include a first part and a second part, wherein the link-member-guide element may be for being disposed at the second part of the body structure and the biasing member may be for being arranged between the link member and the second part of the body structure. The extendable mechanism may further include:
  an auxiliary link member which is provided with an auxiliary extension-member-guide element, wherein the extension member is in engagement with the auxiliary extension-member-guide element of the auxiliary link member in a manner such that the auxiliary link member is retractably movable relative to the extension member in the extension direction;
  an auxiliary-link-member-guide element for being disposed at the first part of the body structure, wherein the auxiliary link member is in engagement with the auxiliary-link-member-guide element in a manner such that the auxiliary-link-member-guide element is retractably movable relative to the auxiliary link member in the extension direction; and
  an auxiliary biasing member for being arranged between the auxiliary link member and the first part of the body structure.

In Example 12, the subject matter of Example 11 may optionally include that the extension member may include at least two stopper elements, one stopper element at each end of the extension member.

In Example 13, the subject matter of Example 11 or 12 may optionally include that the extension member may be engaged with the auxiliary extension-member-guide element of the auxiliary link member via tongue and groove sliding engagements. The auxiliary extension-member-guide element of the auxiliary link member may include a pair of grooves facing towards each other and parallel to the extension direction.

In Example 14, the subject matter of any one of Examples 11 to 13 may optionally include that the auxiliary link member and the auxiliary-link-member-guide element may be engaged in a tongue and groove sliding engagement. The auxiliary link member may include a pair of tongue projections along opposite side edges of the auxiliary link member parallel to the extension direction. The auxiliary-link-member-guide element may include a pair of grooves facing towards each other and parallel to the extension direction.

In Example 15, the subject matter of any one of Examples 11 to 14 may optionally include that the extension member and the auxiliary link member may be arranged in an overlapping configuration.

In Example 16, the subject matter of any one of Examples 11 to 15 may optionally include that the auxiliary biasing member may include a tape spring, a clock spring, a coil spring, a torsion spring, a compression spring, a tension spring, or any combination thereof.

Example 17 is an extendable mechanism between a first part of a body structure and a second part of the body structure. The extendable mechanism including:
  an extension member;
  a first link member which is provided with a first extension-member-guide element, wherein the extension member is in engagement with the first extension-member-guide element of the first link member in a manner such that the first link member is retractably movable relative to the extension member in an extension direction of the extendable mechanism along an axis of the extension member;
  a first-link-member-guide element for being disposed at the first part of the body structure, wherein the first link member is in engagement with the first-link-member-guide element in a manner such that the first-link-member-guide element is retractably movable relative to the first link member in the extension direction;
  a first biasing member for being arranged between the first link member and the first part of the body structure;
  a second link member which is provided with a second extension-member-guide element, wherein the second extension-member-guide element of the second link member is in engagement with the extension member in a manner such that the extension member is retractably movable relative to the second link member in the extension direction;
  a second-link-member-guide element for being disposed at the second part of the body structure, wherein the second-link-member-guide element is in engagement with the second link member in a manner such that the second link member is retractably movable relative to the second-link-member-guide element in the extension direction; and
  a second biasing member for being arranged between the second link member and the second part of the body structure.

In Example 18, the subject matter of Example 17 may optionally include that the extension member comprises at least two stopper elements, one stopper element at each end of the extension member.

In Example 19, the subject matter of Example 17 or 18 may optionally include that the extension member may be engaged with the first extension-member-guide element of the first link member and the second extension-member-guide element of the second link member via tongue and groove sliding engagements. The extension member may include a pair of tongue projections along opposite side edges of the extension member parallel to the extension direction. The first extension-member-guide element of the first link member may include a pair of grooves facing towards each other and parallel to the extension direction. The second extension-member-guide element of the second link member may include a pair of grooves facing towards each other and parallel to the extension direction.

In Example 20, the subject matter of any one of Examples 17 to 19 may optionally include that the first link member and the first-link-member-guide element may be engaged in a tongue and groove sliding engagement. The first link member may include a pair of tongue projections along opposite side edges of the first link member parallel to the extension direction. The first-link-member-guide element may include a pair of grooves facing towards each other and parallel to the extension direction. The second link member and the second-link-member-guide element may be engaged in a tongue and groove sliding engagement. The second link member may include a pair of tongue projections along opposite side edges of the second link member parallel to the extension direction. The second-link-member-guide element may include a pair of grooves facing towards each other and parallel to the extension direction.

In Example 21, the subject matter of any one of Examples 17 to 20 may optionally include that the extension member, the first link member, and the second link member may be arranged in an overlapping configuration.

In Example 22, the subject matter of any one of Examples 17 to 21 may optionally include that each of the first biasing member and the second biasing member may include a tape spring, a clock spring, a coil spring, a torsion spring, a compression spring, a tension spring, or any combination thereof.

Example 23 is a controller including:
  a controller body; and
  an extendable mechanism, wherein the extendable mechanism may include:
    an extension member;
    a link member which is provided with an extension-member-guide element, wherein the extension member is in engagement with the extension-member-guide element of the link member in a manner so as to be retractably extendable from the link member in an extension direction along an axis of the extension member;
    a link-member-guide element which is disposed at the controller body, wherein the link member is in engagement with the link-member-guide element in a manner so as to be retractably extendable from the link-member-guide element in the extension direction; and
    a biasing member which is arranged between the link member and the controller body, and which is configured to apply a biasing force on the link member in a direction opposite to the extension direction.

In Example 24, the subject matter of Example 23 may optionally include that the extension member may include a stopper element at an end of the extension member opposite the extension direction.

In Example 25, the subject matter of Example 23 or 24 may optionally include that the extension member and the extension-member-guide element may be engaged in a tongue and groove sliding engagement. The extension member may include a pair of tongue projections along opposite side edges of the extension member parallel to the axis of the extension member. The extension-member-guide element may include a pair of grooves facing towards each other and parallel to the extension direction.

In Example 26, the subject matter of any one of Examples 23 to 25 may optionally include that the link member and the link-member-guide element may be engaged in a tongue and groove sliding engagement. The link member may include a pair of tongue projections along opposite side edges of the link member parallel to the extension direction. The link-member-guide element may include a pair of grooves facing towards each other and parallel to the extension direction.

In Example 27, the subject matter of any one of Examples 23 to 26 may optionally include that the link member and the extension member may be arranged in an overlapping configuration.

In Example 28, the subject matter of any one of Examples 23 to 27 may optionally include that the biasing member may include a tape spring, a clock spring, a coil spring, a torsion spring, a compression spring, a tension spring, or any combination thereof.

In Example 29, the subject matter of any one of Examples 23 to 28 may optionally include that the extension-member-guide element of the link member may be a separate part fixedly coupled to a link body of the link member.

In Example 30, the subject matter of any one of Examples 23 to 29 may optionally include that the extension member may include two or more holes lined along a length of the extension member at regular interval.

In Example 31, the subject matter of Example 30 may optionally include that the controller body may include a spring-loaded projection disposed at the controller body to cooperate with the two or more holes of the extension member as the extension member is being extended from the controller body.

In Example 32, the subject matter of any one of Examples 23 to 31 may optionally include that the link-member-guide element may be pivotable about a pivot-axis perpendicular to the extension direction to incline the link-member-guide element with respect to the controller body.

Various embodiments have provided an extendable mechanism and a controller that addresses the various issues identified earlier. For example, various embodiments have provided an extendable mechanism and a controller that may eliminate or minimize the risk of the hands of the user being pinched by strong retraction force of the extendable mechanism or the controller. Various embodiments have also provided an extendable mechanism and a controller that may provide stable and wobble-free sliding experience for the user. Various embodiments have also provided an extendable mechanism that may only occupy a small area, for example a small area in controller.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An extendable mechanism for a body structure, comprising:
  an extension member;
  a link member which is provided with an extension-member-guide element, wherein the extension member is in engagement with the extension-member-guide element of the link member in a manner so as to be retractably extendable from the link member in an extension direction along an axis of the extension member;
  a link-member-guide element for being disposed at the body structure, wherein the link member is in engagement with the link-member-guide element in a manner so as to be retractably extendable from the link-member-guide element in the extension direction; and
  a biasing member for being arranged between the link member and the body structure, wherein the extension member and the extension-member-guide element are engaged in a tongue and groove sliding engagement, wherein the extension member comprises a pair of tongue projections along opposite side edges of the extension member parallel to the axis of the extension member, wherein the extension-member-guide element comprises a pair of grooves facing towards each other and parallel to the extension direction.

2. The extendable mechanism of claim 1, wherein the extension member comprises a stopper element at an end of the extension member opposite the extension direction.

3. The extendable mechanism of claim 1, wherein the link member and the link-member-guide element are engaged in a tongue and groove sliding engagement, wherein the link member comprises a pair of tongue projections along opposite side edges of the link member parallel to the extension direction, wherein the link-member-guide element comprises a pair of grooves facing towards each other and parallel to the extension direction.

4. The extendable mechanism of claim 1, wherein the link member and the extension member are arranged in an overlapping configuration.

5. The extendable mechanism of claim 1, wherein the biasing member comprises a tape spring, a clock spring, a coil spring, a torsion spring, a compression spring, a tension spring, or any combination thereof.

6. The extendable mechanism of claim 1, wherein the extension-member-guide element of the link member is a separate part fixedly coupled to a link body of the link member.

7. The extendable mechanism of claim 1, wherein the extension member comprises two or more holes lined along a length of the extension member at regular interval, wherein a spring-loaded projection is disposed at the body structure to cooperate with the two or more holes of the extension member as the extension member is being extended from the body structure.

8. An extendable mechanism between a first part of a body structure and a second part of the body structure, comprising:

an extension member;

a first link member which is provided with a first extension-member-guide element, wherein the extension member is in engagement with the first extension-member-guide element of the first link member in a manner such that the first link member is retractably movable relative to the extension member in an extension direction of the extendable mechanism along an axis of the extension member;

a first-link-member-guide element for being disposed at the first part of the body structure, wherein the first link member is in engagement with the first-link-member-guide element in a manner such that the first-link-member-guide element is retractably movable relative to the first link member in the extension direction;

a first biasing member for being arranged between the first link member and the first part of the body structure;

a second link member which is provided with a second extension-member-guide element, wherein the second extension-member-guide element of the second link member is in engagement with the extension member in a manner such that the extension member is retractably movable relative to the second link member in the extension direction;

a second-link-member-guide element for being disposed at the second part of the body structure, wherein the second-link-member-guide element is in engagement with the second link member in a manner such that the second link member is retractably movable relative to the second-link-member-guide element in the extension direction; and a second biasing member for being arranged between the second link member and the second part of the body structure.

9. The extendable mechanism of claim 8, wherein the extension member comprises at least two stopper elements, one stopper element at each end of the extension member.

10. The extendable mechanism of claim 8, wherein the extension member is engaged with the first extension-member-guide element of the first link member and the second extension-member-guide element of the second link member via tongue and groove sliding engagements, wherein the extension member comprises a pair of tongue projections along opposite side edges of the extension member parallel to the extension direction, wherein the first extension-member-guide element of the first link member comprises a pair of grooves facing towards each other and parallel to the extension direction, wherein the second extension-member-guide element of the second link member comprises a pair of grooves facing towards each other and parallel to the extension direction.

11. The extendable mechanism of claim 8, wherein the first link member and the first-link-member-guide element are engaged in a tongue and groove sliding engagement, wherein the first link member comprises a pair of tongue projections along opposite side edges of the first link member parallel to the extension direction, wherein the first-link-member-guide element comprises a pair of grooves facing towards each other and parallel to the extension direction, wherein the second link member and the second-link-member-guide element are engaged in a tongue and groove sliding engagement, wherein the second link member comprises a pair of tongue projections along opposite side edges of the second link member parallel to the extension direction, wherein the second-link-member-guide element comprises a pair of grooves facing towards each other and parallel to the extension direction.

12. The extendable mechanism of claim 8, wherein the extension member, the first link member, and the second link member are arranged in an overlapping configuration.

13. The extendable mechanism of claim 8, wherein each of the first biasing member and the second biasing member comprises a tape spring, a clock spring, a coil spring, a torsion spring, a compression spring, a tension spring, or any combination thereof.

14. A controller, comprising a controller body; and an extendable mechanism, wherein the extendable mechanism comprises:

an extension member;

a link member which is provided with an extension-member-guide element, wherein the extension member is in engagement with the extension-member-guide element of the link member in a manner so as to be retractably extendable from the link member in an extension direction along an axis of the extension member;

a link-member-guide element which is disposed at the controller body, wherein the link member is in engagement with the link-member-guide element in a manner so as to be retractably extendable from the link-member-guide element in the extension direction; and a biasing member which is arranged between the link member and the controller body, and which is configured to apply a biasing force on the link member in a direction opposite to the extension direction, wherein the link member and the link-member-guide element are engaged in a tongue and groove sliding engagement, wherein the link member comprises a pair of tongue projections along opposite side edges of the link member parallel to the extension direction, wherein the link-member-guide element comprises a pair of grooves facing towards each other and parallel to the extension direction.

15. The controller as claimed in claim 14, wherein the extension member comprises a stopper element at an end of the extension member opposite the extension direction.

16. The controller of claim 14, wherein the extension member and the extension-member-guide element are engaged in a tongue and groove sliding engagement, wherein the extension member comprises a pair of tongue projections along opposite side edges of the extension member parallel to the axis of the extension member, wherein the extension-member-guide element comprises a pair of grooves facing towards each other and parallel to the extension direction.

17. The controller of claim 14, wherein the link member and the extension member are arranged in an overlapping configuration.

18. The controller of claim 14, wherein the biasing member comprises a tape spring, a clock spring, a coil spring, a torsion spring, a compression spring, a tension spring, or any combination thereof.

19. The controller of claim 14, wherein the extension-member-guide element of the link member is a separate part fixedly coupled to a link body of the link member.

20. The controller of claim 14, wherein the extension member comprises two or more holes lined along a length of the extension member at regular interval, wherein the controller body comprises a spring-loaded projection disposed at the controller body to cooperate with the two or more holes of the extension member as the extension member is being extended from the controller body.

* * * * *